(12) United States Patent
Tremain

(10) Patent No.: US 7,448,079 B2
(45) Date of Patent: Nov. 4, 2008

(54) METHOD AND APPARATUS FOR PROVIDING COMPUTER SERVICES

(75) Inventor: Geoffrey Donald Tremain, Surrey (GB)

(73) Assignee: Ernst & Young, LLP (GB)

(*) Notice: Subject to any disclaimer, the term of this patent is extended or adjusted under 35 U.S.C. 154(b) by 600 days.

(21) Appl. No.: 09/898,286

(22) Filed: Jul. 3, 2001

(65) Prior Publication Data
US 2002/0069369 A1 Jun. 6, 2002

Related U.S. Application Data

(60) Provisional application No. 60/216,347, filed on Jul. 3, 2000.

(51) Int. Cl.
*G06F 9/00* (2006.01)
*G06F 15/16* (2006.01)
*G06F 17/00* (2006.01)

(52) U.S. Cl. ....................................................... 726/14
(58) Field of Classification Search ................. 713/201, 713/200; 726/14
See application file for complete search history.

(56) References Cited

U.S. PATENT DOCUMENTS

| | | | | |
|---|---|---|---|---|
| 4,887,202 A | * | 12/1989 | Tanaka et al. ................. 703/21 |
| 5,291,605 A | * | 3/1994 | Takagi et al. .................. 710/48 |
| 5,357,612 A | * | 10/1994 | Alaiwan ....................... 709/216 |
| 5,371,882 A | | 12/1994 | Ludlam ....................... 395/575 |
| 5,381,535 A | | 1/1995 | Gum et al. .................. 395/375 |
| 5,459,857 A | | 10/1995 | Ludlam et al. ......... 395/182.04 |
| 5,499,379 A | * | 3/1996 | Tanaka et al. ................. 710/40 |
| 5,506,975 A | * | 4/1996 | Onodera ......................... 718/1 |
| 5,513,314 A | * | 4/1996 | Kandasamy et al. ........... 714/6 |
| 5,606,668 A | | 2/1997 | Shwed ................... 395/200.11 |
| 5,701,451 A | * | 12/1997 | Rogers et al. .................. 707/1 |
| 5,771,354 A | | 6/1998 | Crawford ............... 395/200.59 |
| 5,799,147 A | | 8/1998 | Shannon ................ 395/182.04 |
| 5,835,726 A | | 11/1998 | Shwed et al. .......... 395/200.59 |
| 5,870,550 A | | 2/1999 | Wesinger, Jr. et al. .. 395/200.48 |
| 5,898,830 A | | 4/1999 | Wesinger, Jr. et al. .. 395/187.01 |
| 5,901,228 A | | 5/1999 | Crawford ..................... 380/25 |
| 5,935,205 A | | 8/1999 | Murayama et al. .......... 709/216 |
| 5,964,886 A | | 10/1999 | Slaughter et al. .............. 714/4 |
| 5,987,506 A | | 11/1999 | Carter et al. ................. 709/213 |
| 6,014,651 A | | 1/2000 | Crawford ..................... 705/400 |
| 6,016,318 A | | 1/2000 | Tomoike ..................... 370/401 |
| 6,035,405 A | | 3/2000 | Gage et al. .................. 713/201 |
| 6,041,166 A | | 3/2000 | Hart et al. ............. 395/200.68 |
| 6,061,349 A | | 5/2000 | Coile et al. ................. 370/389 |
| 6,061,796 A | | 5/2000 | Chen et al. .................. 713/201 |

(Continued)

OTHER PUBLICATIONS

San Jose, Calif, Cisco announces comprehensive enterprise VPN strategy suite VPN solutions. 1999 pp. 1-6.*

(Continued)

*Primary Examiner*—Nasser Moazzami
*Assistant Examiner*—David García Cervetti
(74) *Attorney, Agent, or Firm*—Conley Rose, P.C.

(57) ABSTRACT

An apparatus and method are disclosed for providing one or more computer services to a plurality of customers (A,B,C). At least one virtual machine (VS) is set up on a real computer (30) for each of the customers (A,B,C) at the request of each of the customers (A,B,C). The or each virtual machine (VS) for each of the customers (A,B,C) has a specification specified by the respective customer (A,B,C).

74 Claims, 6 Drawing Sheets

U.S. PATENT DOCUMENTS

| | | | | |
|---|---|---|---|---|
| 6,075,938 | A * | 6/2000 | Bugnion et al. | 703/27 |
| 6,222,856 | B1 * | 4/2001 | Krishnan et al. | 370/468 |
| 6,269,409 | B1 * | 7/2001 | Solomon | 719/329 |
| 6,321,333 | B1 * | 11/2001 | Murray | 713/156 |
| 6,397,242 | B1 * | 5/2002 | Devine et al. | 718/1 |
| 6,434,594 | B1 * | 8/2002 | Wesemann | 709/201 |
| 6,496,847 | B1 * | 12/2002 | Bugnion et al. | 718/1 |
| 6,643,262 | B1 * | 11/2003 | Larsson et al. | 370/236 |
| 6,651,072 | B1 * | 11/2003 | Carino et al. | 707/10 |
| 6,678,825 | B1 * | 1/2004 | Ellison et al. | 726/17 |
| 6,681,240 | B1 * | 1/2004 | Armstrong et al. | 718/104 |
| 6,697,824 | B1 * | 2/2004 | Bowman-Amuah | 709/229 |
| 6,704,925 | B1 * | 3/2004 | Bugnion | 717/138 |
| 6,711,401 | B1 * | 3/2004 | Chow et al. | 455/414.1 |
| 6,714,518 | B1 * | 3/2004 | Weis | 370/248 |
| 6,714,979 | B1 * | 3/2004 | Brandt et al. | 709/225 |
| 6,785,728 | B1 * | 8/2004 | Schneider et al. | 709/229 |
| 6,785,886 | B1 * | 8/2004 | Lim et al. | 718/1 |
| 6,789,118 | B1 * | 9/2004 | Rao | 709/225 |
| 6,789,156 | B1 * | 9/2004 | Waldspurger | 711/6 |
| 6,795,966 | B1 * | 9/2004 | Lim et al. | 718/1 |
| 6,801,949 | B1 * | 10/2004 | Bruck et al. | 709/232 |
| 6,802,068 | B1 * | 10/2004 | Guruprasad | 719/319 |
| 6,804,226 | B1 * | 10/2004 | Durant et al. | 370/355 |
| 6,810,033 | B2 * | 10/2004 | Derks | 370/352 |
| 6,823,458 | B1 * | 11/2004 | Lee et al. | 726/16 |
| 6,948,003 | B1 | 9/2005 | Newman et al. | |
| 6,961,941 | B1 * | 11/2005 | Nelson et al. | 719/319 |
| 6,968,390 | B1 * | 11/2005 | Chavez, Jr. | 709/238 |
| 6,976,258 | B1 | 12/2005 | Goyal et al. | |
| 6,986,052 | B1 * | 1/2006 | Mittal | 713/190 |
| 7,013,481 | B1 * | 3/2006 | Ellison et al. | 726/4 |
| 7,082,615 | B1 * | 7/2006 | Ellison et al. | 726/26 |
| 2001/0011304 | A1 * | 8/2001 | Wesinger et al. | 709/227 |
| 2001/0011307 | A1 * | 8/2001 | Shigetomi et al. | 710/10 |

OTHER PUBLICATIONS

Heathrow, Fl, "Seagate software introduces an innovative new wind based stoage solution for the expanding small business market" 1997, pp. 1-3.*

Doran, R W "Amdahl multiple-domain architecture" IEEE Oct. 1988 pp. 20-28.*

Stewart, K. et al. "The MOtorola PowerPC TM Peek profiler" IEEE Feb. 1997 pp. 342-349.*

Gumaste, U.V. et al. "Configuration management strategy for distributed and diversesoftware development environments" IEEE Dec. 1996 pp. 42-46.*

Rawson, F. L, III "Experience with the development of a microkernel-based, multiserveroperation system" IEEE May 1997, pp. 2-7.*

VMware, VMware™ Application Scenarios, 2000, <http://web.archive.org/web/20000817083902/www.vmware.com/pdf/appscenarios.pdf>.*

VMware, VMware for Windows NT and Windows 2000, 1999, <http://web.archive.org/web/20000831164119/www.vmware.com/pdf/gettingstartednt.pdf>.*

Robert Fargher, First Looks: VMWare 3 Beta, Feb. 2000, <http://www.os2ezine.com/v5n1/vmware3.html>.*

VMware, VMware™ Application Scenarios, May 1999, <http://web.archive.org/web/19990508194932/www.vmware.com/products/appscenarios.html>.*

VMware, VMware Virtual Platform Technical White Paper, May 1999, <http://web.archive.org/web/19990508224230/http://www.vmware.com/products/virtualplatform.html>.*

VMware, Technical White Paper, Feb. 1999, <http://web.archive.org/web/20000817083906/www.vmware.com/pdf/whitepaper.pdf>.*

Maria del Mar Alvarez Rohena, The Integration of Linux, Windows and MacOS, May 3, 2000.*

Peter Newman, Application Outsourcing: the next big thing on the internet, Nov. 1999, Ensim, <http://bmrc.berkeley.edu/courseware/cs298/fall99/newman/ensim$_{13}$10nov99.pdf>.*

ServerXchange, Ensim, Nov. 1999, <http://web.archive.org/web/19991111092210/http://ensim.com/products/servercity_fr.html>.*

ServerCity, Ensim, Oct. 1999, <http://web.archive.org/web/19991012110739/http://ensim.com/products/severcity_fr.html>.*

Masaya Norifusa, "Internet Sercurity: difficulties and solutions", International Journal of Medical Informatics 40, 69-74 (1998).

Kinshuk Govil, et al, "Cellular Disco: resource management using virtual clusters on shared-memory multiprocessors", Operating Systems Review 34(5): 154-169, (1999).

"VMware ESX Server", White Paper Vmware, Incorporated, 1-11, (2000).

*It's Official: IBM Announces Linux for the S/390* [online] Retrieved from the Internet:<URL: http://www.linuxplanet.com/linuxplanet/reports/1848/1 (2 p.).

Peter Newman, Outsourcing Intranet Application, Hot Interconnects VIII, Aug. 2000; at www.hoti.org/archive/hoti8papers/014.pdf.

* cited by examiner

METHOD AND APPARATUS FOR PROVIDING COMPUTER SERVICES

CROSS-REFERENCE TO RELATED APPLICATIONS

This application claims benefit of priority of U.S. Provisional Application Ser. No. 60/216,347, filed Jul. 3, 2000.

STATEMENT REGARDING FEDERALLY SPONSORED RESEARCH OR DEVELOPMENT

Not applicable.

TECHNICAL FIELD OF THE INVENTION

The present invention relates to a method and to an apparatus for providing computer services. In the preferred embodiment, the present invention relates to a method and to an apparatus for providing computer services across a network by making available what is referred to herein as "virtual servers", optionally using "virtual networks".

BACKGROUND

It is well known that individuals and organisations continually upgrade their computer equipment. For example, an individual or organisation may simply want to improve the speed of running of currently owned software applications and will therefore typically purchase a new computer or network server, as appropriate, in order to obtain a more recent and therefore faster central processor unit, more and/or faster memory, etc. An individual or organisation may require additional and/or faster file and/or data storage because of growth in the size of files or amount of data that is stored or simply for quicker access to the stored files/data. As a further example, newer software applications may have a minimum computer specification that exceeds that currently owned by the individual or organisation. As will be discussed in more detail below, the purchase of additional or new, upgraded computer equipment brings numerous problems, including particularly the requirement for a significant capital outlay and for time to be spent in installing and setting up the new equipment. In any event, the cost of maintaining computer equipment can be significant, both in financial terms and in respect of the time spent in maintenance.

Today's IT applications (both off-the-shelf and custom-designed or bespoke) tend to be designed around smaller-scale Intel architecture servers running the Microsoft NT® or Windows 2000® operating systems, and more recently Linux®, BSD®, and other Unix® variants. These smaller scale systems tend to proliferate in organisations, leading to the management difficulties described above. Though mainframe-type computers may offer lower "total cost of ownership" for certain applications, the industry trend of moving away from those architectures has meant that applications are simply not designed to run on them, and "porting" the application is likely to be unacceptably disruptive, risky and costly.

Furthermore, in e-business infrastructure provision, for Internet-hosted applications, organisations have expended significant time, resources and money procuring and setting up and maintaining new hosting systems comprising a plurality of separate servers, firewalls, network routers and switches, all for the purpose of delivering one or more applications across the Internet to users.

The current state of the art in connection with a number of particular computer-related areas will now be briefly discussed.

File and Data Servers, Including Archiving Services individuals and commercial, non-commercial and government organisations currently make use of file and data servers using one or more file/data sharing protocols such as NFS, NFS+, SMB, and Appleshare, allowing storage of and access to computer-held information on shared computer systems. These computer systems run file-sharing software and are either owned and operated by the individual or organisation using them, or are outsourced to a third party organisation to operate. File and data servers can also be used to archive information.

As demands increase, individuals and organisations either upgrade existing servers, or where this is not done, additional or upgraded replacement servers are procured.

Application Service Provision

Individuals and commercial, non-commercial and government organisations currently make use of IT (information technology) applications that run on computer systems. These computer systems run one or more applications and are either owned and operated by the individual or organisation using them, or are outsourced to a third party organisation to operate. Many individuals and organisations have now begun using Applications Service Providers to provide IT applications services via the Internet or other external network.

Prior art techniques involved in applications delivery across the Internet or other network involve either: multiple organisations sharing a single applications instance running on a single real server, which has associated security, manageability and availability issues; multiple organisations, each with their own applications instance running on a single real server, which also has associated security, manageability and availability issues; multiple organisations, each with their own applications instance running on multiple server partitions on a single real server, which has limitations as the partitions are typically static; or multiple organisations, each with their own dedicated server held at an ASP hosting centre, each running a dedicated application instance.

Database Service Provision

Individuals and commercial, non-commercial and government organisations currently make use of IT applications which access client/server or distributed databases running on computer systems. These computer systems run one or more applications and are either owned and operated by the individual or organisation using them, or are outsourced to a third party organisation to operate. Many individuals and organisations have now begun using external Service Providers to provide client/server or distributed database services via the Internet or other external network.

Prior art techniques involved in client/server or distributed database server delivery across the Internet or other network involve either: multiple organisations sharing a single database management system instance running on a single real server, which has associated security, manageability and availability issues; multiple organisations, each with their own database management system instance running on a single real server, which also has associated security, manageability and availability issues; multiple organisations, each with their own database management system instance running on multiple server partitions on a single real server, which has limitations as the partitions are typically static; or multiple organisations, each with their own dedicated database server held at an service provider's hosting centre running one or more instances of the database management system.

Data Warehouse Service Provision

Individuals and commercial, non-commercial and government organisations currently make use of IT applications which access conventional, client/server or distributed data warehouses running on computer systems. These computer systems run one or more applications and are either owned and operated by the individual or organisation using them, or are outsourced to a third party organisation to operate. Many individuals and organisations have now begun using external Service Providers to provide client/server or distributed data warehouse services via the Internet or other external network.

Prior art techniques involved in conventional client/server or distributed data warehouse server delivery across the Internet or other network involve either: multiple organisations sharing a single data warehouse management system instance running on a single real server, which has associated security, manageability and availability issues; multiple organisations, each with their own data warehouse management system instance running on a single real server, which also has associated security, manageability and availability issues; multiple organisations, each with their own data warehouse management system instance running on multiple server partitions on a single real server, which has limitations as the partitions are typically static; or multiple organisations, each with their own dedicated data warehouse server held at an ASP hosting centre.

Knowledge Service Provision

Individuals and commercial, non-commercial and government organisations currently make use of knowledge management systems, such as Intranet, Extranet and Internet web servers, search engines, web cache, free text retrieval systems and knowledge sharing applications such as Lotus Notes/Domino, which access client/server or distributed knowledge management databases running on computer systems. These computer systems run one or more applications and are either owned and operated by the individual or organisation using them, or are outsourced to a third party organisation to operate. Many individuals and organisations have now begun using external Service Providers to provide client/server or distributed knowledge management services via the Internet or other external network.

Prior art techniques involved in client/server or distributed knowledge management server delivery across the Internet or other external network involve either: multiple organisations sharing a single knowledge management system instance running on a single real server, which has associated security, manageability and availability issues; multiple organisations, each with their own knowledge management system instance running on multiple server partitions on a single real server, which has limitations as the partitions are typically static; or multiple organisations, each with their own dedicated knowledge management servers held at a service provider's hosting centre.

Digital Media Production Servers

Individuals and commercial, non-commercial and government organisations currently make use of file and data servers allowing storage of and access to computer-held digital media information on shared computer systems during the course of audio recording and production, video recording and production, digital photography and imaging, television programme making, film making, hologram production and production of other multimedia material. The digital media information may consist of data files containing the images, moving pictures or audio recordings in digital form, but may also contain information relating to how the information is to be processed within studio systems, such as edit decision lists or MIDI files containing automated sequencing and mix-down information. These computer systems run file-sharing software and are either owned and operated by the individual or organisation using them, or are outsourced to a third party organisation to operate. As demands increase, individuals and organisations either upgrade existing servers, or where this is not done, further servers are procured.

"Intellectual Property" and Streaming Media Servers

Individuals and commercial, non-commercial and government organisations currently make use of "intellectual property" servers allowing storage of and access to computer-held digital media or other "intellectual property" information on shared computer systems. These computer systems run "intellectual property" management, licensing and download applications and are either owned and operated by the individual or organisation using them, or are outsourced to a 3rd party organisation to operate. The "intellectual property" may include but not be limited to digital photographs, sound recordings, video recordings, digital movies, still holograms, moving holograms, digital animations, software, firmware, drawings, designs, schematics, plans and documents.

Prior art techniques involve: multiple organisations sharing a single "intellectual property" system instance running on a single real server, which has associated security, manageability and availability limitations; multiple organisations using multiple "intellectual property" system instances running on a single real server, which has associated security, manageability and availability limitations; multiple organisations, each with their own "intellectual property" system instance running on multiple server partitions on a single real server, which has limitations as the partitions are typically static; or multiple organisations, each with their own dedicated "intellectual property" servers operated internally or at an "intellectual property" hosting centre.

Web Hosting

Individuals and commercial, non-commercial and government organisations currently make use of world-wide-Web servers which run on computer systems. These computer systems run one or more web applications and contain one or more sets of web content and are either owned and operated by the individual or organisation using them, or are outsourced to a third party organisation to operate. Many individuals and organisations use Internet Service Providers to provide Web hosting services via the Internet or other external network.

Prior art techniques involved in Web hosting applications delivery across the Internet or other external network involve either: multiple organisations sharing a single Web server applications instance running on a single real server, which has associated security, functionality, manageability and availability issues; multiple organisations, using "virtual Web servers" which are created by a single Web server application instance on a single real server, which also has associated security, manageability and availability issues; multiple organisations, each with their Web server instance running on multiple server partitions on a single real server, which has limitations as the partitions are typically static; or multiple organisations, each with their own dedicated Web server held at an external service provider's hosting centre.

Complex e-Commerce Web Hosting

Individuals and commercial, non-commercial and government organisations currently make use of world-wide-Web e-Commerce systems which run on computer systems. These computer systems run one or more associated Web servers, database servers and applications and are either owned and operated by the individual or organisation using them, or are outsourced to a third party organisation to operate. Many individuals and organisations use Hosting Service Providers to provide complex Web hosting services via the Internet or other external network.

Prior art techniques involved in complex Web hosting applications delivery across the Internet or other external network involves construction of a complex array of dedicated server hardware to provide Web server, security firewall, database server, applications server and various systems development, test and management server capabilities, at often high capital cost and significant procurement and installation lead time, and occupying significant amounts of floor space in hosting centres.

Computer and High-Performance-Computation Service Provision

Individuals and commercial, non-commercial and government organisations currently make use of IT applications which run on desktop or server computer systems of limited computational performance. These computer systems run one or more applications and are either owned and operated by the individual or organisation using them, or are outsourced to a third party organisation to operate. Many individuals and organisations have now begun using Service Providers to provide high-performance-computation services via the Internet or other external network. There is a desire to use more powerful computation services either directly, or indirectly by means of automatic invocation by an applications program running on an existing IT system.

Prior art techniques involved for providing high-performance computing services via the Internet or other external network involves either: multiple organisations sharing a single applications instance running on a computation server or supercomputer, which has associated security, manageability and availability issues; multiple organisations, each with their own applications instance running on a single real server, which also has associated security, manageability and availability issues; multiple organisations, each with their own applications instance running on multiple server partitions on a single real server, which has limitations as the partitions are typically static; or multiple organisations, each with their own dedicated server held at a high performance computing centre.

Electronic Messaging and Conferencing Service Provision

Individuals and commercial, non-commercial and government organisations currently make use of electronic messaging servers which run on computer systems. These computer systems run one or more applications and are either owned and operated by the individual or organisation using them, or are outsourced to a third party organisation to operate. Many individuals and organisations have now begun using Internet Service Providers to provide messaging and conferencing services via the Internet or other external network.

Prior art techniques involved in messaging service delivery across the Internet or other external network involve either: multiple organisations sharing a single messaging or conferencing applications instance running on a single real server, which has associated security, manageability and availability issues; multiple organisations, each with their own messaging or conferencing applications instance running on a single real server, which also has associated security, manageability and availability issues; multiple organisations, each with their own messaging or conferencing applications instance running on multiple server partitions on a single real server, which has limitations as the partitions are typically static; or multiple organisations, each with their own dedicated messaging or conferencing server held at a service provider's hosting centre.

Learning Neuro-Computer Service Provision

Work is currently being done to research and develop learning neuro-computers. To allow these systems to be accessible to multiple individuals and organisations, networks may be used to connect customers to one or more learning neuro-computer applications which execute on one or more conventional or learning neuro-computer hardware platforms. Customer terminals for accessing these systems may use conventional computer technology or learning neuro-computer technology.

For each of the services described above, the limitations and disadvantages of the current state of the art include the fact that procurement of additional capacity takes significant time to do (e.g. for ordering, configuration and installation); additional servers involve additional maintenance and operational support costs; extra capital expenditure is incurred; systems availability, reliability, backup and management become more difficult and costly as the number of servers increases; start-up ventures require large amounts of capacity to get started, yet may be unwilling or unable to afford the large initial commitments and costs involved; joint ventures between organisations requiring shared access to information and data require separate servers to be installed for security or operational reasons; server capacity is provisioned to provide acceptable service under peak load or storage usage conditions, such that capacity is typically over-provisioned for unnecessary cost; temporary business requirements necessitate procurement of temporary servers and capacity, often involving procurement of equipment and systems which might not be needed beyond the temporary requirement; smaller and medium sized servers are unable to take advantage of more sophisticated high-availability technology or technologies which enable more efficient use of secondary disk and tape storage; consolidation of services onto a larger server computer is made difficult because of the need to justify to management the capital procurement costs of a large system together with the need for specialist resources needed to maintain and support it effectively; additional intrusion detection systems running on separate hardware often needs to be added in high-security applications to detect attacks; prototype of development and test systems need to be separately provisioned, with additional hardware cost and system management implications; and, provision of backup facilities for disaster recovery purposes often involves the procurement of similar or identical hardware and software systems and configuring them ready to run services if main systems fail, resulting in increased complexity and cost.

SUMMARY OF THE PRESENT INVENTION

According to a first aspect of the present invention, there is provided apparatus providing one or more computer services for a plurality of customers, the apparatus comprising a real computer on which is set up at the request of each of said customers at least one virtual machine for each of said customers, said at least one virtual machine for each of said customers having a specification specified by the respective customer.

The real computer will typically have one or more real processors running a real operating system, real physical memory (which in general may be of any suitable type), and one or more real storage devices (such as hard disks, tapes, holographic or other optical storage devices, etc. and, in future, even storage systems which store information at the molecular level or quantum level). A customer will typically pay the apparatus provider/operator for making the virtual machine available, perhaps on a one-off basis or on an ongoing basis, perhaps by regular subscription. The cost can be calculated on the basis of one or more of several different factors. The apparatus may be configured so that users other than or unrelated to a particular customer may access that customer's virtual machine, optionally only if given authority to do so and/or on payment of a fee or subscription.

Plural virtual machines may be set up within the real computer for at least one of said customers.

The or each virtual machine for at least one of said customers may be connected to a virtual network set up for said at least one customer within the real computer. Preferably, a virtual intrusion detection device is provided for detecting an attack on the virtual network.

At least one virtual machine may be connected to a virtual firewall that is connectable to an external network to which customers and/or other users can connect such that access to said at least one virtual machine by a customer or other user via a said external network can only take place through a virtual firewall.

The or each virtual machine for a particular customer may be connected to a virtual firewall that is dedicated to that customer's virtual machine or machines, each virtual firewall being connectable to an external network to which each of said customers and/or other users can connect such that access to a virtual machine by a customer or other user via a said external network can only take place through a virtual firewall provided for that virtual machine or machines. Each virtual firewall may be set up within the real computer, the or each virtual machine for each customer being connected to a first port of the virtual firewall that is dedicated to that customer's virtual machine or machines, each virtual firewall having a second port connected to a virtual network that is set up within the real computer and that is connectable to an external network. The second port of each virtual firewall may be connected to the same virtual network that is set up within the real computer and that is connectable to an external network.

The or at least one of the virtual firewalls is preferably implemented by a virtual machine on the real computer, said virtual firewall virtual machine running firewall software.

The apparatus preferably comprises a plurality of real data storage devices and at least one virtual storage subsystem that is configured to allow said real data storage devices to emulate one or more virtual storage devices. The at least one virtual storage subsystem is preferably configured to emulate at least one respective virtual storage device for each customer. A detection device is preferably provided for detecting evidence of malicious software or hostile attack signatures on the at least one virtual storage subsystem.

The apparatus is preferably configurable to provide at least one of the services selected from: file, data and archiving services; applications hosting services; database hosting services; data warehouse services; knowledge management hosting services; digital media production services; "intellectual property" and streaming media services; simple web hosting services; complex e-Commerce web hosting services; high performance computation services; electronic messaging and conferencing services; and, learning neurocomputer services.

The apparatus may comprise virtual private network software to provide an encrypted communication channel for communication between a first virtual network and a second virtual network.

The apparatus preferably comprises virtual private network software to provide an encrypted communication channel for communication between a virtual network and an external computer.

The real computer may comprise plural physical computers. Such plural physical computers may all be configured, controlled and managed by a common configuration, control and management system, which will typically be computer-implemented. Such a system can be used to ensure that the resources of the plural physical computers are used most efficiently in operating the virtual machines for the plural customers, for example by processor or memory load-balancing between the plural physical computers according to the instantaneous demand.

There may be provided in combination, a first apparatus as described above and a second apparatus that is substantially identical to said first apparatus, the first and second apparatus being connected by a communications channel so that the second apparatus can provide for redundancy of the first apparatus thereby to provide for disaster recovery if the first apparatus fails.

According to a second aspect of the present invention, there is provided a method of providing one or more computer services for a plurality of customers, the method comprising the steps of: setting up on a real computer at the request of each of said customers at least one virtual machine for each of said customers, said at least one virtual machine for each of said customers having a specification specified by the respective customer.

The method may comprise the step of setting up plural virtual machines within the real computer for at least one of said customers.

The method may comprise the steps of setting up a virtual network for at least one of said customers within the real computer, and connecting the or each virtual machine for said at least one customer to said virtual network.

The method may comprise the step of using a virtual intrusion detection device for detecting an attack on the virtual network.

The method may comprise the steps of connecting at least one virtual machine to a virtual firewall, and connecting the or each virtual firewall to an external network to which customers and/or other users can connect such that access to a virtual machine by a customer or other user via a said external network can only take place through a virtual firewall.

The method may comprise the step of connecting the or each virtual machine for a particular customer to a virtual firewall that is dedicated to that customer's virtual machine or machines, and connecting each virtual firewall to an external network to which each of said customers and/or other users can connect such that access to a virtual machine by a customer or other user via a said external network can only take place through a virtual firewall provided for that virtual machine or machines. Each virtual firewall is preferably set up within the real computer, the or each virtual machine for each customer being connected to a first port of the virtual firewall that is dedicated to that customer's virtual machine or machines, each virtual firewall having a second port connected to a virtual network that is set up within the real computer and that is connected to an external network. The second port of each virtual firewall may be connected to the same virtual network that is set up within the real computer and that is connectable to an external network.

The method may comprise the step of configuring at least one virtual storage subsystem to allow multiple real data storage devices to emulate one or more virtual storage devices. The method may comprise the step of configuring the at least one virtual storage subsystem to emulate at least one respective virtual storage device for each customer. The method may comprise the step of using a detection device for detecting evidence of malicious software or hostile attack signatures on the at least one virtual storage subsystem.

According to a third aspect of the present invention, there is provided a method of operating a real computer on behalf of plural customers, the method comprising the step of: operating plural virtual machines on the real computer, each of said plural virtual machines having a specification specified by a respective one of the customers in accordance with a computer service to be provided by the virtual machine on behalf of that customer.

The method may comprise the step of operating plural virtual machines within the real computer for at least one of said customers.

The method may comprise the step of operating a virtual network for at least one of said customers within the real computer, the or each virtual machine for said at least one customer being connected to said virtual network.

The method may comprise the step of using a virtual intrusion detection device for detecting an attack on the virtual network.

At least one virtual machine may be connected to a virtual firewall, the or each virtual firewall being connected to an external network to which customers and/or other users can connect such that access to a virtual machine by a customer or other user via a said external network can only take place through a virtual firewall.

The or each virtual machine for a particular customer may be connected to a virtual firewall that is dedicated to that customer's virtual machine or machines, each virtual firewall being connected to an external network to which each of said customers and/or other users can connect such that access to a virtual machine by a customer or other user via a said external network can only take place through a virtual firewall provided for that virtual machine or machines. Each virtual firewall is preferably set up within the real computer, the or each virtual machine for each customer being connected to a first port of the virtual firewall that is dedicated to that customer's virtual machine or machines, each virtual firewall having a second port connected to a virtual network that is set up within the real computer and that is connected to an external network. The second port of each virtual firewall may be connected to the same virtual network that is set up within the real computer and that is connectable to an external network.

At least one virtual storage subsystem may be provided and configured to allow multiple real data storage devices to emulate one or more virtual storage devices. The at least one virtual storage subsystem may be configured to emulate at least one respective virtual storage device for each customer. A detection device may be used for detecting evidence of malicious software or hostile attack signatures on the at least one virtual storage subsystem.

In any of the methods described above, the services provided may include at least one of the services selected from: file, data and archiving services; applications hosting services; database hosting services; data warehouse services; knowledge management hosting services; digital media production services; "intellectual property" and streaming media services; simple web hosting services; complex e-Commerce web hosting services; high performance computation services; electronic messaging and conferencing services; and, learning neuro-computer services.

Any of the methods described above may comprise the step of using virtual private network software to provide an encrypted communication channel for communication between at least some of said virtual machines.

Any of the methods described above preferably comprises the step of using virtual private network software to provide an encrypted communication channel for communication between at least one virtual machine and an external computer.

Any of the methods described above may comprise the step of using virtual private network software to provide an encrypted communication channel for communication between a first virtual network and a second virtual network.

Any of the methods described above preferably comprises the step of using virtual private network software to provide an encrypted communication channel for communication between a virtual network and an external computer.

According to a fourth aspect of the present invention, there is provided a method of providing for a plurality of customers one or more computer services selected from: file, data and archiving services; applications hosting services; database hosting services; data warehouse services; knowledge management hosting services; digital media production services; "intellectual property" and streaming media services; simple web hosting services; complex e-Commerce web hosting services; high performance computation services; electronic messaging and conferencing services; and, learning neuro-computer services; the method comprising the steps of: setting up on a real computer at the request of each of said customers at least one virtual machine for each of said customers, said at least one virtual machine for each of said customers having a specification determined in accordance with the computer service or services requested by said customer.

Any of the methods above may comprise the step of moving said at least one virtual machine from a first real computer to a second real computer.

The preferred embodiment of the present invention involves the delivery of computer services over a network (which may be a private network, a virtual private network, an industry or other "extranet" (i.e. a private network shared by many organisations), or the Internet). To customers or other users, the services will appear entirely normal and as though provided using real computers, etc., as the direct interface, rather than through the virtual servers, etc., provided by the preferred embodiment of the present invention. Taking as an example the provision of a remote file server service, a customer wanting a file server having a particular type of CPU, amount of memory, data storage capacity, etc., can simply contact a provider of the services with the requirements. The provider will then set up virtual arrangements on a real computer, as discussed in more detail below. This contact by the customer may be made electronically and the set up by the provider may be carried out automatically in response thereto. To the customer, the virtual file server appears exactly as though it were a real file server having a real CPU, real memory, real data storage disks, etc., on the customer's own internal network. If at any time the customer requires for example additional memory or data storage capacity, whether permanently or temporarily, this can be ordered by the customer, preferably on-line, and made available practically instantaneously, preferably automatically. Even small businesses and individuals will effectively have access to the most recent and most complex processors, memory devices, data storage devices, etc.

The preferred embodiment of the present invention can provide delivery of: network file and data services, including archiving services; applications hosting services; database hosting and database services; data warehouse services; knowledge management hosting services; digital media production storage services; "intellectual property" and streaming media services; simple Web hosting services; complex e-Commerce Web hosting services; high-performance computation services; electronic messaging and conferencing services; and, learning neuro-computer services; all using secure "virtual computers" which are created using virtual server technologies on one or more real computers. These secure "virtual computers" will typically run on a collection of one or more real computers operated in a secure hosting centre that provides service delivery across a communications network, which typically may be insecure and which may include the Internet or one or more real private or virtual private networks.

In general terms, an example of a suitable apparatus for carrying out the preferred embodiment of the present invention is constructed by taking a conventional real computer system comprising one or more real CPUs (central processor units), real memory, real disk or other storage and real network and real I/O (input/output) systems, and then loading software comprising an operating system and a virtual machine abstraction program, which allows the creation of several virtual servers on one physical server. Operating systems and other software that allow delivery of the various services, such as those discussed above, are then loaded onto the virtual servers. The physical computer system is then connected to a network system to which a number of customers are connected, and the virtual servers running the services are then made available to the customers to configure and set up. Multiple users within each of the customer organisations or other (possibly unrelated) users can then make use of the relevant services being provided on the virtual servers, whilst the customers' applications and data are held isolated from each other using the virtual machine isolation mechanisms. In this way, the services can be provided to multiple separate customers using separate virtual servers, whilst using one computer system as opposed to several separate real computer systems as in prior art approaches.

It will be understood that the present invention is not concerned with the technology of virtual machines and how they operate per se. Rather, the preferred embodiment of the present invention is concerned with applications of virtual machines to performing certain types of work, together with various optional or preferred variations and enhancements which may be applied to any and all applications.

The particular variations and enhancements which may be employed should be chosen and configured to yield the greatest benefits for the customers. The combination of enhancements employed for greatest benefit will differ according to a number of factors, including for example: the commercial and pricing models used by the service provider; the mix of services provided; the industry sectors to whom this is provided; and, the commercial view taken by the service provider, including the approach to investment in technology. Possible variations and enhancements will be discussed below.

DETAILED DESCRIPTION OF THE PREFERRED EMBODIMENTS

Various preferred aspects of the present invention, including variations and enhancements thereto, will now be discussed.

Variations and Enhancements

Reference is made throughout this specification to the variations and enhancements described below. Some of these variations and enhancements will in practice be highly desirable for commercial and/or security and/or technical reasons. It will be understood that other variations and enhancements may be used. At least some of these variations and enhancements make use of known prior art techniques.

Virtual Machines and Virtual Servers

Virtual machine technology is used in the preferred embodiment of the present invention. Virtual machine technology per se is not in itself new. Indeed, IBM pioneered the technology in the 1960s and the 1970s with the IBM VM product which allowed a mainframe computer to be divided into a number of virtual IBM mainframes on which a number of different operating systems could be run. A number of researchers have also designed software technologies which optimise the use of virtual machines, for example on scaleable multiprocessors. For example, in U.S. Pat. No. 6,075,938, there is disclosed software which can be used in the creation and control of plural virtual machines on a large scale shared memory multiprocessor computer.

The preferred embodiment of the present invention makes use of virtual machine technologies in the construction and operation of computer hardware and software apparatus and methods for their operation which allows delivery of services across a network to customers by a service provider.

Virtual machine technology typically comprises special software which is written to run on a real computer system which itself comprises one or more central processing units, physical memory, disk storage devices, tape storage devices, network interface devices and other input/output devices. When the virtual machine software is run, it can create a virtual computer or server which comprises virtual central processing units, "virtual physical" memory space, virtual disk or tape or other storage devices, virtual network interface devices and other virtual input/output devices. Commodity off-the-shelf computer operating systems (such as Microsoft NT, Windows 2000, Linux, Solaris, BSDI, etc.) can be run on the virtual machines as if they were real, physical machines and allow the popular up-to-date computer applications which are either custom-developed, available "off-the-shelf", or system-integrated from a number of off-the-shelf and bespoke modules which would normally be run on a physical computer to be run inside the virtual machine. To the operating system running on the virtual machine, the virtual machines appear real. Multiple virtual machines can be created by virtual machine software such that several virtual computing environments can be created which would otherwise require a number of separate physical computers as is commonly the case using prior art apparatus and methods. These can be interconnected by virtual networks (see below) such that, for example, complex e-business systems infrastructure normally requiring a plurality of physical servers, security firewalls, network routers and switches can be "virtualised" inside one physical computer.

Use of Multiple Levels of Guest Virtual Server

For certain applications, it may be advantageous to create a second layer of virtual servers within a first layer of virtual servers which themselves run on a real computer. This additional abstraction may be used to create further security compartmentalisation or allow machine load and resources to be balanced more effectively.

Virtual Networks Within the Real Server

Virtual networks may be created within the real server to which virtual servers may be attached.

Virtual networks can be created by software in such a way as to create virtual network interface devices and a virtual Local Area Network which emulates Ethernet (IEEE802.3), Token Ring (IEEE802.5) or other network protocols. These virtual network devices and virtual networks allow one or more virtual machines to communicate with each other. As far as the operating systems and applications running on the machine are concerned, they are simply connected by a fast network conforming to one or more industry standards.

Virtual Security Firewalls

Embedded "virtual security firewalls" may be used to provide protection to virtual servers and virtual networks and between virtual networks created within the real server if the virtual networks need to be interconnected but with only certain traffic being allowed to pass through.

Virtual security firewalls operate similarly to conventional firewalls in that they consist of a special firewall software application which runs on a host operating system on a computer. The firewall application may be custom-written or purchased off-the-shelf from a number of software companies (Network Associates, Check Point, etc. (see for example U.S. Pat. No. 5,835,726)) and programmed to allow devices connected to computers or networks to which the firewall is connected to communicate in a way which is limited by a set of rules. These rules are programmed into one or more configuration files and specify, for example, from which network addresses and ports connections may be made through the firewall to corresponding other ports on a second network to which the firewall connects. Complex arrangements can be created where, for example, six separate networks may be interconnected by a six-interface firewall system which will then selectively allow computers connected to the six networks to communicate with each other subject to limitations programmed into the firewall. The firewall system may also be programmed to detect attempts to communicate through it which violate the rules and can generate log files and audit trails which can alert a security operator to investigate. It should be noted that in the preferred implementation of the present invention, the virtual firewall will be running on top of an operating system which itself is running on the respective virtual machine. In other words, ultimately the virtual firewall is itself running on the respective virtual machine.

Virtual Private Networks

Embedded "virtual private network" and network tunnelling capabilities may allow encrypted communications to pass to or between virtual servers (possibly connected to one or more virtual networks within the real server), and/or another sub-network, via another network (which may be insecure or vulnerable to attack).

Virtual private networks (VPNs) allow communication between two or more computers or networks via a third network which may be very widely or loosely connected (such as the Internet). The virtual private network technologies (see for example U.S. Pat. No. 5,835,726) are designed such that a computer runs special software which provides a virtual private network gateway to encrypt traffic and send it across the insecure third network to another gateway which decrypts the information and sends it on to the destination computer or network, and vice versa. Industry standards such as IPSEC have been devised to allow standard interoperability between multiple vendors' virtual private network software.

Storage

Advanced secondary storage subsystems using prior art virtual disk and tape mechanisms, and hierarchical disk-to-tape systems, each of which may be of a type known per se in the prior art, may be provided to optimise the use of physical storage. Other more advanced types of storage may be used, as mentioned above. These systems operate in addition to the virtualisation of storage carried out ordinarily by the virtual machine operating software itself.

In a number of examples of virtual machine operating software, such as those produced by VMware and IBM, the virtual machine operating software creates virtual disk devices and maps them to "container files" within the physical disk storage system attached to the physical computer on which the virtual machines have been created.

The preferred embodiment of the present invention takes advantage of the fact that such systems allow storage capacity to be allocated to virtual servers such that the total storage capacity offered may exceed the actual amount of storage capacity physically connected. This is because not all virtual servers will fill up all of their allocated storage all of the time.

Advanced secondary storage subsystems of the type manufactured by StorageTek, IBM and others optimise the use of physical storage such that virtual servers may run conventional software which requires no special disk or tape drivers, whilst the physical server may use advanced proprietary software to communicate with the advanced storage mechanisms. These advanced storage mechanisms, amongst other things, cache frequently-accessed data in very high speed semiconductor RAM (thus eliminating time delays normally incurred in disk track seek time, rotational latency, rotational speed and disk head read/write speed); optimise the placement of data on the real disks to enhance performance (in order to reduce disk actuator seek time and rotational latency involved with spinning magnetic storage); provide the ability to "snapshot" virtual disks to provide instant copies for archival or roll-back purposes; and optimise space utilisation by eliminating duplicate copies of the same information stored in two separate places (such as when a file or group of files is copied). Virtual tape systems (as manufactured by StorageTek, IBM, Hitachi and other suppliers) may be used to create tape drives of the sort which commodity operating systems running on virtual machines are programmed to communicate with, when in fact the real storage consists of high-speed disk storage and proprietary high-performance tape storage of a sophistication which commodity operating systems cannot readily use. Finally, hierarchical storage systems can automatically migrate infrequently used files (which may consist of entire virtual disks) from high-cost rotating disk storage to low-cost serial-access or random-access tape systems which may utilise automatic robotic tape libraries coupled with multiple tape drives.

Virtualisation of disk storage by the virtual machine software may be combined with the virtual storage system's capabilities in order to performance-optimise the storage provided to virtual machines in terms of capacity, throughput and performance. Storage Area Networks (SANs) may be used to connect real computers to one or more advanced virtual disk and tape storage systems via SCSI or Fibrechannel, either directly or via Storage Area Network switches, locally or over distances, allowing virtual servers running in one city to access data from storage located in another city, or possible duplicated across a number of locations to improve resilience to disasters.

Such virtual storage and storage area network systems are known in themselves and available from a number of companies including for example Storage Technology Corporation of Louisville, Colo., USA. Reference may also be made for example to U.S. Pat. Nos. 5,459,857 and 5,371,882.

Memory Management

Advanced virtual memory management systems can be set up within the physical server and its host operating system such that it cooperates with the virtual server software to allow virtual servers to appear to have physical memory, the sum of which may exceed the amount of "virtual physical memory" present on the real server. This is possible because not all virtual servers will use all of their allocated apparent physical memory all of the time.

Back-Ups

Back-up systems can be set up such that either the virtual servers back up their own storage to external devices, such as tape drives which are directly connected, or they back up their storage to the host server via real or virtual network connections. Back-up systems can also be set up such that the virtual servers do not need to perform their own back-ups. Instead, the real server performs a back-up of the files and datasets which contain the storage and configurations of the virtual servers.

Checkpointing, Archiving and Disaster Recovery of Virtual Servers

Facilities may be provided to allow virtual servers (or groups of virtual servers) to be checkpointed to preserve server and virtual processor states and to make a copy of the server for archival purposes or to allow the whole virtual server to be moved across a data network to another real computer. Movement of servers could be used for example for test purposes, to facilitate movement of the virtual server for business reasons, to balance servers for performance reasons, or to move servers for redundancy purposes. Manual or automatic sequenced checkpointing of virtual servers can be used for high-availability applications because the checkpointed virtual server can be restarted on reliable physical server hardware when unreliable hardware fails or indicates it is about to fail. Copies of single or multiple checkpointed virtual servers may be used to provide disaster recovery services on another real computer if primary real computer servers fail.

CPU and Memory

CPU and memory capacity in physical servers can be provided by a number of technologies. Single or multi-processor servers can either be used singly or clustered together in multiples with virtual servers distributed among them. These servers may either access locally-attached secondary storage or may share central storage on a Storage Area Network (which itself might employ virtual disk and tape technology as described above). Massively parallel shared-memory or NUMA (Non-Uniform Memory Access) or ccNUMA (cache-coherent Non-Uniform Memory Access) computers may be used to deliver larger physical servers on which multiple virtual servers providing services may be run. Physical servers may be hardware-partitioned into discrete processing units of one or more CPUs, on each of which multiple virtual servers may be run.

Code-Morphing Servers

Using known code-morphing technology, for example of the type pioneered by Transmeta, single, multiple or massively parallel computers may be constructed using processor technology which morphs itself to emulate the instruction set of another central processor. An operating system and virtual server system may be constructed on this hardware platform to allow creation of multiple virtual servers that have different virtual processor architectures, allowing the features and benefits of this invention to be exploited with even greater performance and flexibility.

Special-purpose virtual machine hosting computers may be specially constructed using code-morphing processors to allow the virtualisation of a very great number of computers of radically different systems architectures, such as Intel Pentium, Intel Itanium, Compaq Alpha, Sun Ultrasparc, PA-RISC, and Motorola PowerPC.

Machine Simulation Servers

Using a mix of machine simulation software and technology, single, multiple or massively parallel computers may be constructed using processor technology which runs an operating system. Code is run on this operating system to emulate the instruction set and machine architecture of another central processor and computer system. An operating system and virtual server system may be constructed on this hardware platform to allow creation of multiple virtual servers that have different virtual processor architectures, allowing the features and benefits of this invention to be exploited with even greater performance and flexibility. Machine simulation software is commercially available from a number of vendors allowing, for example, IBM System/390 processors, DEC VAX systems, and Intel Itanium architectures to be emulated using an Intel Pentium processor.

Use of Emerging Technologies

Recent and emerging advanced processor, memory and secondary storage technologies may be utilised to deliver virtual servers which appear to be constructed of conventional technologies. This allows services to be provided with even greater performance, lower cost and greater flexibility whilst retaining current services, operating systems and applications using commodity software. These newer processor technologies may be specifically designed to provide virtual server platforms, and may employ scalar, parallelising, pipelining, vector and array instruction sets (allowing execution of multiple instructions on multiple streams or blocks of data simultaneously), register architectures, logic unit architectures and interfaces which specifically lend themselves to this application. For high-availability virtual server creation, processors may be developed specifically for virtual server use or general purpose processors may be employed to allow high-availability voting-type systems to be used. Extremely high speed technologies such as optical computers (which use switching of light beams to process information, create logic gates and create memory storage), quantum computers (which use quantum-mechanical principles to process and store information), and molecular computers (which create logic gates and memory at the molecular level) may in principle be used with special virtualisation software to create multiple commodity virtual machines which, despite virtualisation and simulation inefficiencies, would run orders of magnitude faster than today's processor and memory technologies. Memory and secondary storage systems which employ binary or multi-state logic or analogue processing may be used. Storage elements which employ holography to store information either in conventional switched logic memory (using dedicated Fourier transform logic circuitry) or other materials such as polymer crystalline structures (using light beam holography) may be used by the physical machine such that the virtual machine software uses this memory to create very large amounts of "virtual physical" memory for use by commodity virtual machines running commodity operating systems.

These techniques would allow a company producing these advanced computing technologies to exploit those technologies and gain commercial advantage from those technologies without revealing details of their operation to competitors.

Use of a Learning Neuro-Computer

Artificially intelligent learning neuro-computer technology may be used to provide multiple virtual artificially intelligent learning neuro-computers using known and emerging technology. Using learning neuro-computer systems with a number of processing synapses, software may be written and ran such that a real learning neuro-computer system creates a number of virtual learning neuro-computer systems with a number of virtual processing synapses which may or may not map singly or multiply to real processing synapses.

Furthermore, using known and emerging technology for learning neuro-computer systems with a number of processing synapses, software may be written and run such that a real learning neuro-computer system creates a number of virtual legacy, conventional or code-morphing servers and services allowing, for example, commodity or legacy operating systems and applications to be run on very advanced neuro-computer hardware platforms. These learning neuro-computers themselves may either execute directly using special hardware, or may themselves be programmed within virtual neuro-computer machines which then execute on advanced optical, quantum or molecular computers.

Use of Advanced Interconnection and Distributed Processing Systems

Using known and emerging technology, real computer systems may be distributed around a network and interconnected such that a number of real computer systems operate as one, fault-tolerant cooperating machine. Such a machine may employ conventional, code-morphing or learning neuro-computer processing technology, together with conventional or holographic memory and storage subsystems, which might also be distributed around the network. The software on the machine will make use of the network and internal interconnects in a similar way, allowing for bandwidth limitations, to distribute processing and information storage.

Control of Virtual Servers

Control of virtual servers may for example be by means of directly-attached consoles on the real computer hosting them, or by means of consoles connected across an in-band or out-of-band network system which may or may not be connected to virtual networks inside the real server.

Configuration of Virtual Servers

Configuration of virtual servers may for example be by means of a real host-server-based configurator program, by means of a network-accessible manual or semi-automatic configurator program, or by means an automatic configurator program linked to a transactional application allowing end-users of the system to pay for, set up and self-configure one or more virtual servers in a stand-alone or networked configuration. Configuration of virtual servers may also be automated using programming tools that create virtual hardware platforms to meet the needs of software or systems applications that are automatically or manually created and introduced to the virtual hardware. Configuration of virtual servers and virtual networks may be performed as above using on-line or off-line systems, where for example a sales agent may draw a virtual server and network configuration using a computer-based utility which, when ready, is transmitted to the service provider and converted into a configuration of virtual servers and networks within a very short time.

Control and Management of the Real Computer and Storage Systems

The real computer on which virtual servers run may for example be managed and controlled by means of directly-attached consoles on the real computer or by means of consoles connected across an in-band or out-of-band network system which may or may not be connected to the virtual networks inside the real server. These consoles may allow the operating parameters of the real computer to be monitored and controlled by operations staff and may utilise graphical displays for control and monitoring tools that allow one or more real computers that are each hosting one or more virtual servers to be managed and controlled.

Enhanced Security Isolation

Security isolation of the virtual servers is in practice particularly important. Enhanced security may be achieved by use of a trusted secure kernel and other trusted computing base elements on the real server, together with use of secure trusted virtual server abstraction software. This trusted software would be developed using a secure systems development lifecycle according to the Common Criteria for secure computer systems evaluation. In addition, security functionality involving labelled security compartments can be used. In this way, virtual servers may be run for a number of customers for whom trustworthiness of technical security is important, with each virtual server running at a different level of security, while the real computer, its operating system and virtual server software provide very trustworthy and technically secure compartments in which the virtual servers may execute.

Security Intrusion Detection

To provide for intrusion detection above and beyond the security functionality which may be incorporated by customers into virtual server host systems, and without interfering with the virtual server host systems, virtualised network intrusion detection systems running on the real computer can monitor the traffic on the virtual networks to detect, according to static, dynamic, or heuristic rule sets, whether one or more virtual computers is being misused or subjected to a hostile attack. Intrusion detection software is specially written to detect a number of pre-programmed or self-learnt attack signatures which can be as simple as an unauthorised connection attempt from a certain network address to another network address and port range which is to be protected, up to heuristic pattern recognition of typical hacker attack sequences. The virtual intrusion detection systems can then alert one or more system operators. Alternatively or additionally, analysis, evasion or response processes may be automatically invoked, for example to shut down or to tighten host or firewall security. In addition, virtual intrusion detection systems can run on the real computer and automatically scan memory and storage space for patterns which indicate the presence of malicious software or activity. Multiple intrusion detection systems can correlate information together across a single real server, multiple servers within a service provider, or multiple real servers across a number of service providers, and then stimulate a manual or automatic corrective response.

Inter-Subsystem Cooperation

To optimise the performance of the various services running on virtual server systems, mechanisms can be used to enable cooperation between the real server, virtual servers and storage subsystems such that they operate as one cooperating "virtual machine hosting mainframe system".

Continuous Upgrade Capability

To allow continuous upgrading, virtual servers may be run on real servers and storage subsystems that allow CPU, storage and input/output capacity to be disconnected, reconfigured and upgraded while the virtual servers continue to deliver services. Depending on the actual hardware used, different generations of hardware (such as CPUs) may be mixed on one system, and virtual servers allowed to move dynamically between CPUs of different capability.

Usage Monitoring and Charging

Utilisation by and charge-back to the customer can be computed in a number of ways. Accounting mechanisms can be built into the virtual server or real computer software to allow service utilisation of virtual servers to be computed together with software licence payment issues. These accounting facilities can be integrated into the configuration software allowing pay-as-you-go usage charged using a number of different tariff structures singly or simultaneously.

Rapid Start-Up

To allow for rapid start-up of virtual servers providing services, virtual servers may be copied from pre-configured virtual servers which have been pre-loaded with the most popular software configurations.

Resource Balancing

Control facilities may be inserted into the virtual server or real host operating system software to allow service operators to set and vary the operating parameters for individual virtual servers and real hardware/software subsystems. These parameters may include the priorities of virtual servers with respect to each other, the extent of memory which they can allocate, and the amount of system and network input/output bandwidth and resources they can consume.

The present invention and its preferred embodiments have a number of benefits that serve to dramatically increase the speed-to-market, cost-effectiveness, flexibility, manageability, reliability and performance of the virtual-hosted services in such a way as to dramatically increase the market share of service providers or other customers employing this invention. In particular, the ability to allocate further resources in terms of CPU capacity, main memory storage or secondary storage to virtual computers under software control means that customers of the various services can reconfigure and upgrade their virtual computer-provided services with great speed and ease, provided capacity remains in the central resource pool. Separation and abstraction of the CPU resources of the virtual servers from those of the real server means that a number of virtual servers providing user services can be created irrespective of the number of physical CPUs in the real server, providing great flexibility and cost-effectiveness. Use of virtual disk and tape storage subsystems allows storage to be allocated to virtual servers which exceeds the amount of physical storage actually connected, allowing significant cost savings to the service operator which may be passed on to customers. Use of advanced virtual disk and tape systems by the host real computer allows further consolidation of storage space, reduced costs, and enhanced performance, even though the operating systems and applications running on the virtual servers see virtual disks and do not require special software to be in place. Operational costs to run and maintain server systems are significantly reduced due to economies of scale and the greater reliability of virtual server systems running on high-availability hardware with managed hardware and storage systems. Systems installation and configuration costs for services are significantly reduced owing to the virtualisation of the systems, the ability to replicate standard configurations for use by customers, and the ability to configure complex configurations of virtual servers and virtual networks under software control. Start-up ventures requiring systems capacity do not need to purchase and install capital hardware items; instead, services can be instantly provided on a pay-as-you-go basis. Joint ventures can use separate virtual servers for their services, operated by external hosting service providers. Within a specific industry sector, sector-specific services can be provided such that joint-venture project services and single-organisation services are provided identically but from separate virtual server systems. Hardware systems capacity can be macro-managed to be able to cope with average load levels and individual peaks, to take into account the projected utilisation level of the virtual servers providing services, all with significant cost savings compared to prior art methods involving separate hardware servers for each application and/or customer. Temporary customer requirements can be easily serviced provided capacity exists; when such requirements no longer exist, the entire environment can be preserved for future activation. Customer's services running on virtual servers can be simple in their configuration, yet still take advantage of the capacity, manageability and performance benefits provided by large-scale systems and storage subsystems. Consolidation of multiple customer servers onto one or more large virtual servers does not require capital outlay by the customer; the service provider balances capacity and capital outlay using highly tuned business processes for managing the virtual hosting business. Advanced network and host based security intrusion detection systems can be run without interfering with individual virtual servers, and without requiring additional dedicated intrusion detection hardware. Prototype, development and test systems can be easily cloned from production systems or vice versa, and do not require provision of extra dedicated hardware. Complex configurations of servers together with security firewalls can be constructed very quickly in "virtual space", allowing very high speed to market for complex e-business systems. Future computer hardware and software technologies may be used by the real hosting computer without detrimental impact or change to existing running services and applications. Services consisting of one or more virtual servers may be checkpointed or shut down and relocated onto other hosting systems or hosting providers at very high speed for disaster recovery or other purposes. Advanced computer services involving learning neuro-computers may be provided to a number of organisations. Advanced neuro-computers may be used to simulate one or more virtual servers of a conventional type, allowing future computer systems to execute legacy software and provide legacy services.

It should be borne in mind that at present if an organisation wishes for example to host an e-business application online on the Internet, contact would initially have to be made with a hosting service provider with adequate rack space in a hosting centre. Eight weeks would then typically be spent procuring and installing the customer-specific computer equipment and bringing the system up to a sufficiently fault-free operational state. In contrast, in accordance with the preferred embodiment, once a specification for such infrastructure has been determined by a customer and passed to a provider, which would typically be done on-line, an entirely equivalent virtual system can be brought into being, entirely or semi-automatically, literally within a matter of minutes or less.

It can be seen that service providers can provide virtualised IT and e-business infrastructure services which almost entirely eliminate the need for customer organisations to procure their own physical IT server infrastructure, either within their own offices, in the offices of an IT outsourcing company, or within an Internet hosting service provider's offices, and instead make use of virtualised IT infrastructure delivered by a hosting service provider.

Moreover, as mentioned above, the service provider can offer a total notional processor capacity, memory capacity and a total storage capacity to the totality of customers which in each case may exceed the actual processor capacity, real memory capacity and real storage capacity available in reliance on the fact that not all customers will use all of their allocated processor capacity, memory capacity and storage capacity all of the time. In practice, the provider will monitor to ensure that the real processor, memory or storage capacity is not approached or exceeded, perhaps taking measures to add further real capacity if needed.

Embodiments of the present invention will now be described by way of example with reference to the accompanying drawings, in which.

It is important to note that apparatus in accordance with the preferred embodiment of the present invention takes on two distinct parts, physical and virtual.

First, in the physical world, apparatus comprising computer rooms, power supplies, servers, storage subsystems, network switches and other physical apparatus building blocks is assembled together to provide a high-performance computing platform with particular features which lends itself to high-performance virtualisation of computers, storage and networks.

Secondly, using the virtual machine, network and storage technologies described previously, a series of apparatus are constructed in the "virtual world".

Though there are performance and capacity considerations, it should be noted that in general the actual configuration of the physical apparatus is not dependent on the configuration of the virtual apparatus or vice versa. This unique property means that virtual apparatus constructed on one particular physical apparatus type to deliver a service can be successfully relocated onto different physical apparatus of a different design or scale without the need for physical reconfiguration or patching as would conventionally be required. Once the virtual hosting system is assembled, subject to performance and capacity constraints, in general any design of virtual systems configuration can be assembled on it.

Physical and Logical System Architectures

Figure 1:
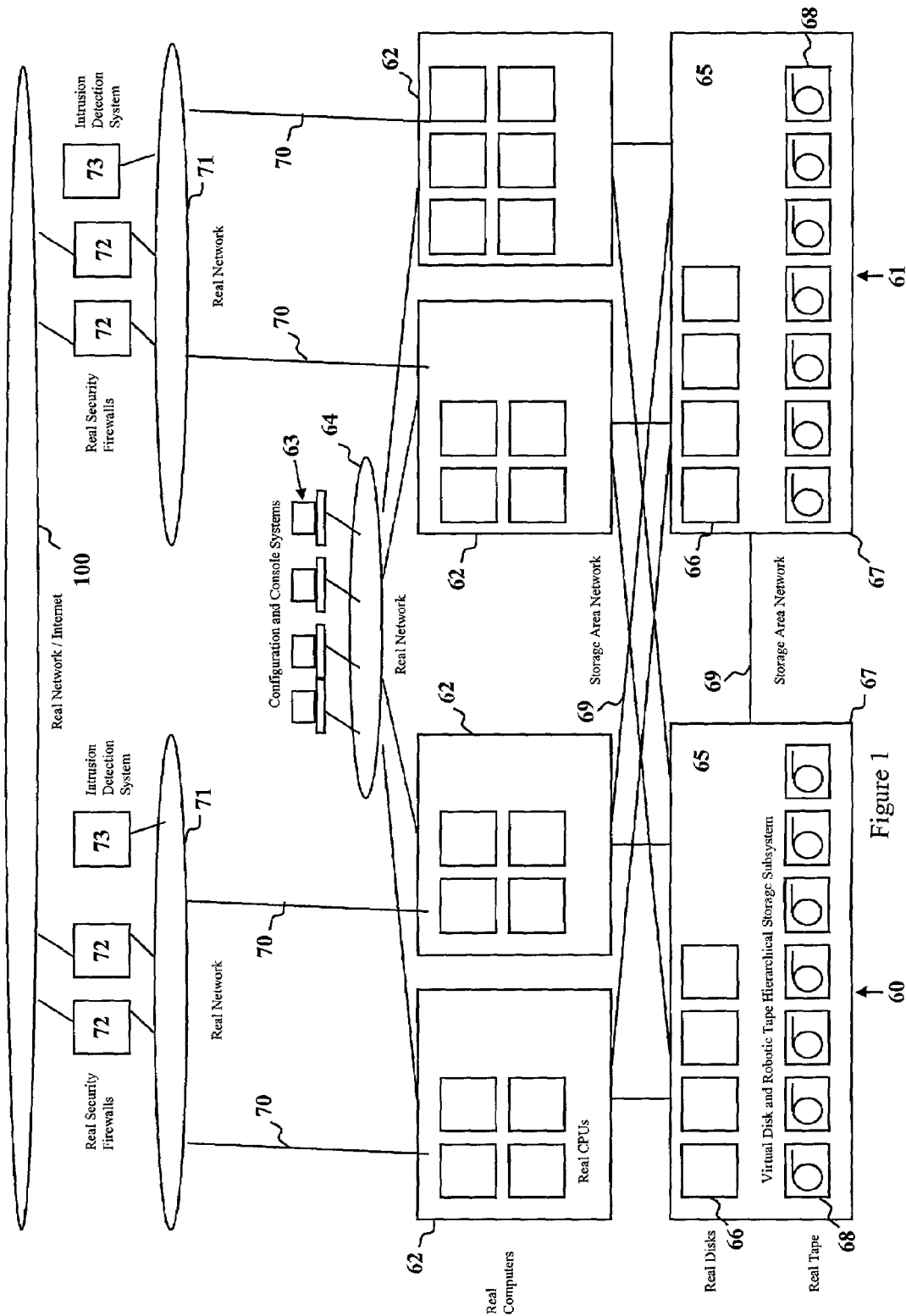
FIG. 1 shows schematically a first example of a physical system architecture for an embodiment of the present invention.

FIG. 1 shows schematically an example of a physical system architecture for an embodiment of the present invention and illustrates the interrelationships between hardware components. FIG. 1 shows how all services can be delivered using a common virtual server infrastructure architecture. The diagram illustrates use of the following variations and enhancements: advanced secondary virtual disk and tape subsystems which employ physical memory caching to optimise throughput and reduce storage access rotational latencies and seek times; use of hierarchical storage systems to backup virtual servers; CPU/Memory provision in real servers; control systems for management of the real computer and storage systems; and, security intrusion detection.

A computer room 60 is prepared with air-conditioning and clean, redundant power. A similar computer room 61 is prepared in another building some miles or kilometers away. Multiple high-bandwidth fibre-optic communications links are put in place between the computer rooms 60,61. Having two computer rooms 60,61 and multiple hardware and connection systems as described below provides for disaster recovery and resilience capabilities.

A large number of racks of multi-processor servers 62, or interconnected NUMA or ccNUMA massively parallel computers 62, which could contain, for example, up to 512 processors per computer, are configured with maximum CPU and memory configurations (for example 2 terabytes per computer) and installed in each of the computer rooms 60,61. Storage area network (e.g. Fibrechannel) and Local Area Network (e.g. Gigabit Ethernet or ATM) interface cards are installed in each of the individual servers 62. Out-of-band console management subsystems 63 are connected via a real network 64 to allow start-up, configuration, control, monitoring and shutdown of the individual servers 62. These various local area network and storage area network connections and interface adapters are fitted to the computers in such a way as to ensure that the Input/Output bandwidth is maximised and that potential performance bottlenecks are eliminated. This is done by identifying the maximum possible Input/Output bandwidth of the main computers containing the processors, then, depending on the system's architecture, installing a plurality of interface cards such that the central processors can drive data through those interfaces with the maximum possible throughput and lowest latency. These interfaces are then coupled into the storage area network which is provisioned with sufficient bandwidth, which may dictate a certain configuration of storage area network switches/routers. In turn, these switches/routers are coupled to virtual storage subsystems, to be described below, again with sufficient interfaces and connection paths as to permit the highest possible data throughput and lowest latency.

A number of virtual storage subsystems 65 are configured to allow multiple real physical disks 66 to emulate one or more arrays of virtual disks of different sizes, for example with a total size in excess of 5 terabytes and, in optimum configurations, several hundred terabytes of storage. These are installed in each of the computer rooms 60,61. Virtual robotic disk/tape subsystems 67 are configured to automatically migrate unused data from the virtual storage subsystems 65 through disk buffers to real tape subsystems 68. These are installed in each of the computer rooms 60,61. Using the virtual storage and virtual disk/tape subsystems 65,67, storage of all virtual servers created in the real computers 62 is automatically backed up by the storage subsystems 65.

Storage Area Network switches are installed in each of the computer rooms 60,61 and the server 62, virtual storage 65 and virtual disk/tape subsystems 67 are connected to each other and the Storage Area Network switches using a Storage Area Network 69. Cross-over connections between the computer rooms 60,61 are also provided by the Storage Area Network 69.

Two or more high-speed network switches (e.g. Gigabit Ethernet) 70 are installed in each of the computer rooms 60,61 to carry customer traffic. The high-speed network switches 70 are connected together via a real network 71 and to each of the individual real servers 62.

Two or more high-speed security firewall appliances 72 are installed in each of the computer rooms 60,61 and respectively connected to the real networks 71 to which the high-speed network switches 70 are connected. The firewall appliances 72 are connected to one or more external networks 100, which might include the Internet, at high speed (e.g. 2.4 Gbps). Intrusion detection sensors 73 are installed and connected to the high-speed network switches 70.

The control consoles 63 are installed and interconnected with the various system components as required to manage and control the various system components. As shown, the control consoles 63 may be connected to a separate physical network 64 which connects to the storage subsystems 65 and servers 62 separately from the network systems 69,70 that carry customer traffic.

Figure 2:
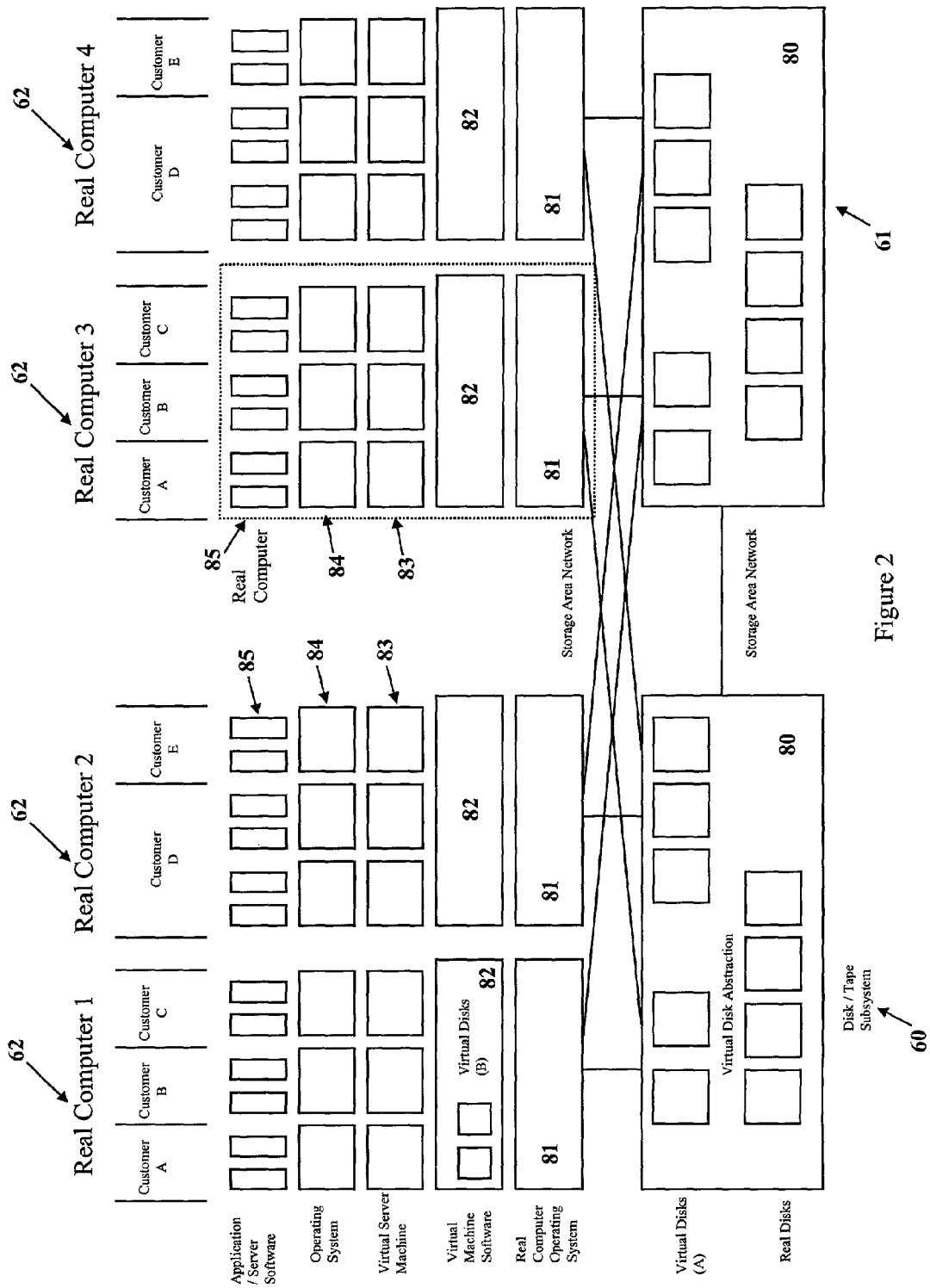
FIG. 2 shows schematically an example of a logical system architecture corresponding to the physical system architecture of FIG. 1.

Referring now to FIG. 2, there is shown schematically an example of a logical system architecture corresponding to the physical system architecture shown in FIG. 1 and the interrelationships of hardware and software modules. FIG. 2 illustrates how all services can be delivered using a common virtual server infrastructure. The diagram illustrates use of the following variations and enhancements: two levels of storage virtualisation; advanced secondary virtual disk and tape subsystems; and, checkpointing, archiving and disaster recovery of virtual servers using Storage Area Networks.

Referring now to FIG. 2, virtual storage arrays 80 are configured to provide operating system load and page/swap space for the racks of servers and/or parallel computers 62 in each of the computer rooms 60,61 of FIG. 1. Real Operating System software 81 is installed on the server systems 62 which use a virtual storage array 80, such as a virtual disk and tape storage system 80, as their primary disk system. The server systems 62 are then started and booted up. Virtual machine operating software 82 is then installed on the server systems 62, together with required configuration and control software. In optimised configurations, functions of the real operating system 81 and virtual machine operating software 82 are closely combined to optimise performance. Resource management and reporting systems are also installed and configured.

Pre-configured virtual servers 83 are then prepared and stored within configuration and virtual storage container files and include virtual machine operating systems 84 and application and/or server software 85 for the different customers A,B,C,D,E. A plurality of first-level virtual disks (B) within the virtual servers 83 are stored as second-level virtual disks. Second-level virtual disk partitions or container files on the virtual disk and tape storage systems 80 are attached to the real computer operating systems 81 and virtual machine software 82. The virtual disk and tape storage systems 80 provide a further level of virtualisation by spreading data across real physical disks and tapes in a way which optimises efficiency, performance and capacity. Storage management systems are configured when using two levels of storage virtualisation to cooperate with the virtual machine operating software 82 to optimise storage space efficiency, utilisation and performance. Software interfaces to customer-oriented configuration, reporting, control and management systems (not shown) are set up, which allow customers to pay for, configure and set up interconnected networks of virtual servers, optionally using graphical user interfaces. Scanning intrusion detection system daemons are also preferably started to automatically scan all attached system storage for fingerprints of hostile or malicious software or attack patterns.

Alternative arrangements for the apparatus will now be described to illustrate the overall system architectures in terms of more specific components.

Example Physical Apparatus Design 1:

This design for the physical apparatus is based, for illustrative purposes, on construction of the physical apparatus using public prior art technology building blocks from IBM and VMware which are commercially available.

Figure 3:
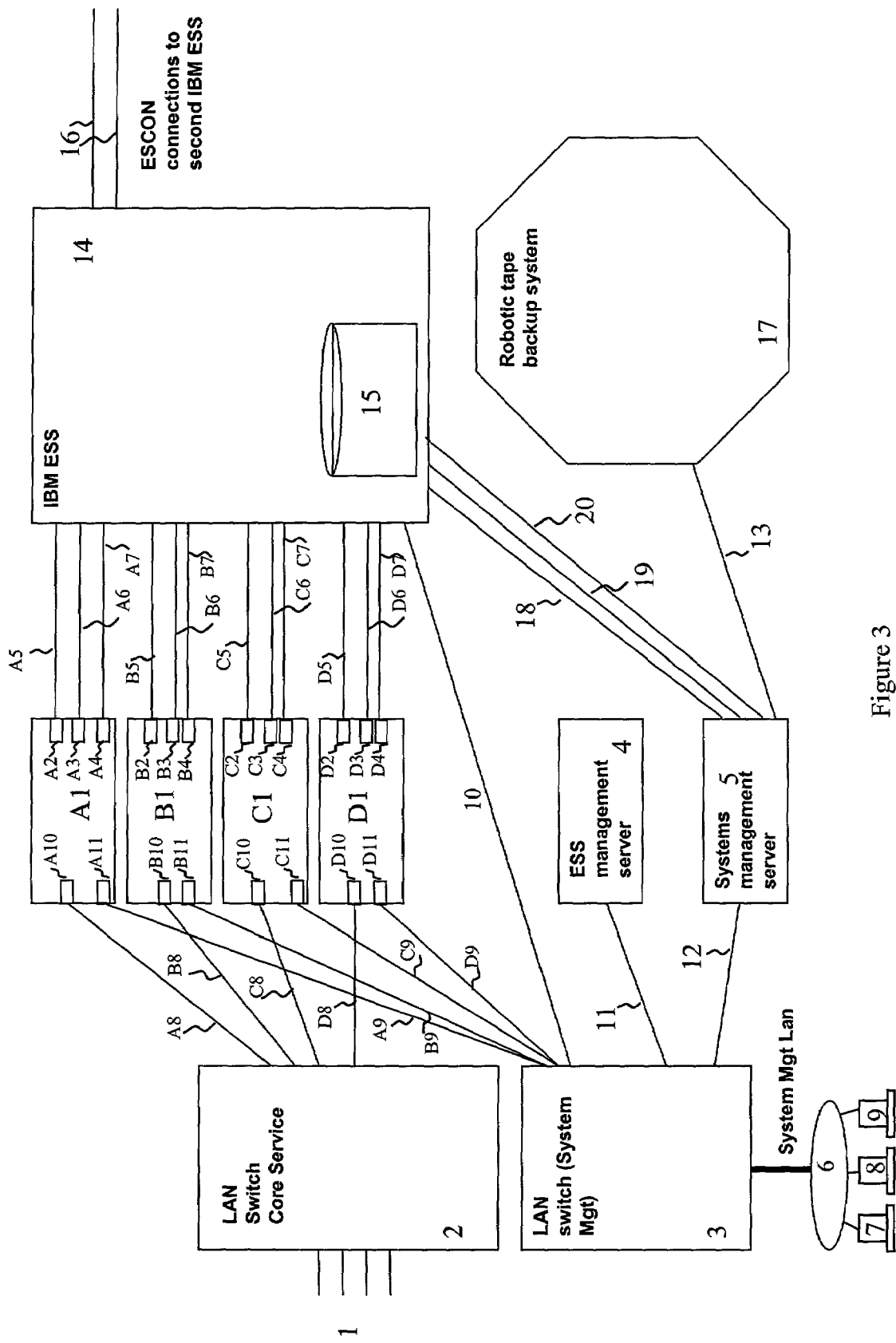
FIG. 3 shows schematically an example of an alternative physical system architecture for an embodiment of the present invention.

A computer room is prepared with air conditioning and clean, redundant three-phase power supplies (three phase power typically being required for larger storage subsystems). A similar computer room is constructed some distance away, within the limitations of the storage area network interconnection systems Referring now to FIG. 3, a standard 19 inch (approx. 48 cm) width industrial equipment rack is prepared and four IBM Netfinity x370 servers A1,B1,C1,D1 configured with eight Pentium III Xeon 933 MHz 2 MB cache processors and 4 GB main memory (expandable to 32 GB) are installed. No local disk storage is installed within the servers. Ultra-fast Wide SCSI adapter cards A2,B2,C2,D2 are fitted into each of the servers, together with two Fibrechannel adapters A3/A4, B3/B4,C3/C4,D3/D4. The two Ultra-wide SCSI channels per system are used primarily for system booting and other system management storage purposes. The two Fibrechannel adapters per system are used primarily for the purpose of connecting storage which will eventually be used by the virtual machines to be hosted on the servers.

More than one Fibrechannel interface is provided to maximise the Input/Output throughput of the system. Assuming the systems Peripheral Component Interconnect (PCI) bus runs at 66 MHz and is 64 bits wide, the maximum burst transfer rate on a single PCI bus is 528 Mbytes/second, whereas the peak burst Input/Output throughput of the Fibrechannel connection is 100 Mbytes/second.

The keyboard/video/mouse console connections for the four systems are connected directly to keyboards, monitors or mice directly, via a Keyboard/Video/Mouse switch, or via an advanced system management PCI adapter card. At least two Gigabit Ethernet PCI cards are fitted to each server, one A10,B10,C10,D10) for primary network connections between virtual machines and external networks which link to customers, the other for service management purposes.

The storage subsystem part of the apparatus is constructed using an IBM Enterprise Storage System F20 storage array 14, which is fully configured with arrays of 36 GB disks 15, eight Fibrechannel adapters and interconnects A6/A7,B6/B7, C6/C7,D6/D7, and two dual-port SCSI adapters and interconnects A5,B5,C5,D5, used for provisioning of main virtual machine disk storage and system booting/management respectively. An additional SCSI adapter and interconnect 18 and pair of Fibrechannel adapters and interconnects 19,20 is used for a further systems management server which can be connected to robotic tape backup systems 17 by Fibrechannel or ESCON interconnects 13 to provide disk storage backup to tape. Finally, two proprietary IBM ESCON connections 16 are used to link the storage array 14 to a second storage array at another location to allow a mirror copy of availability-critical information to be kept. The IBM ESS 14 is provided with the maximum amount of physical memory cache to optimise disk performance. Currently the maximum is 32 GB, and the disks for virtual machine data storage are configured as RAID-5 arrays at the current maximum size, limited by the IBM ESS 14, of 224 GB.

The IBM ESS 14 is configured to provide 2 terabytes of storage on average to each of the four connected x370 processing servers, as five 224 GB Fibrechannel direct-connected virtual disks per each of the two Fibrechannel interfaces, plus a further four system disks of 18 GB provided to each of the four connected servers via the SCSI interfaces. In this configuration, the IBM x370 servers A1,B1,C1,D1 "see" single SCSI or Fibrechannel disks; whereas the IBM ESS storage array 14 virtualises the internal disks which are arranged as RAID arrays for performance and reliability, and connected via a large memory cache. This relieves the operating system kernel running on each of the x370 servers A1,B1,C1,D1 of having to manage a RAID disk system or provide memory cache.

The primary Gigabit Ethernet interfaces on the four IBM x370 servers A1,B1,C1,D1 are connected to a high-speed Gigabit Ethernet switch 2 (such as those manufactured by Cisco). The secondary Gigabit Ethernet interfaces on the four IBM x370 servers A1,B1,C1,D1 are connected to a second high-speed Gigabit Ethernet switch 3 for systems management purposes. These two switches 2,3 are not connected together.

An Ethernet port 10 of the IBM ESS storage array 14, the separate storage systems management server 5, the ESS console computer 4 (a separate workstation running Microsoft Windows NT and special systems management software), other systems provisioning and management systems 7,8,9, and local area network 6, are also connected to the second Gigabit Ethernet switch 3.

A second physical apparatus of the type described above located in a geographically separate location can be constructed and interconnected with the first, for example by means of Gigabit Ethernet and IBM ESCON.

Once the physical apparatus is assembled, the base operating software of each of the various network and storage devices is loaded and configured to present the network and storage facilities as described above, though at this stage the IBM x370 servers need not be started. Then, to create the virtual machine environments, VMware ESX software is loaded onto one of the x370 servers and installed on the 18 GB system disk provisioned to it by the IBM ESS. Once installed, the VMware software is started and virtual machines and virtual networks can then be configured manually or automatically by means of online configuration tools to provide virtual machine environments to meet customer requirements. This system image can be copied for use by the other IBM x370 servers, using for example FlashCopy facilities provided on the IBM ESS, allowing the further servers to be started.

Once the system is started and customer virtual machines are being created and utilised as discussed further below, a number of systems management and performance software tools can be used to optimise overall systems performance in a way which would be prohibitive from a manpower perspective on smaller systems. For example, facilities provided by the IBM ESS allow disk storage capacity and performance to be managed pro-actively using a single management console and performance bottlenecks eliminated.

Example Physical Apparatus Design 2:

In this design, the apparatus is assembled much as in design 1 described above except that the four IBM x370 servers are replaced by a single NUMA massively parallel server, such as an IBM x430 64 processor server, or similar server of similar or greater processing capacity available from other hardware manufacturers. This has the advantage of allowing a single hosting system image to be used, which simplifies storage management and systems management significantly, thereby reducing operating costs. This massively parallel server is connected to the storage subsystem by multiple Fibrechannel or IBM ESCON interfaces to provide very high Input/Output bandwidth between the server and the storage subsystem. An enhancement could include the use of multiple storage subsystems connected via a very high bandwidth Storage Area Network employing Storage Area Network Fibrechannel switches. Clearly the operating system kernel and the virtual machine software will need to be designed to operate properly on a machine of different physical architecture and make use of Storage Area Networks, though as stated previously, the configurations of virtual systems apparatus which are possible are unaffected.

Example Physical Apparatus Design 3:

In this design, a very basic configuration is described, which is suitable for only small scale hosting work and which may not deliver the significant economy-of-scale benefits in terms of floor space, systems capacity, and especially systems management and support as the more complex designs described above.

A physical operating environment comprising floor space, power, and air conditioning is prepared. A single 4-way processor server (such as a Dell Poweredge 6400) is configured with 4 GB of physical memory, a split 4×2 disk backplane, internal RAID controller, eight 36 GB disks, and two Gigabit Ethernet network adapter cards, one for connection to the customer via a network, the other for connection to a systems management network.

VMware ESX software is loaded onto the server to create the virtual machine environments. Once installed, the VMware software is started and virtual machines and virtual networks can then be configured manually or automatically by means of online configuration tools to provide virtual machine environments to meet customer requirements.

"Virtual Apparatus" Construction

Figure 4:
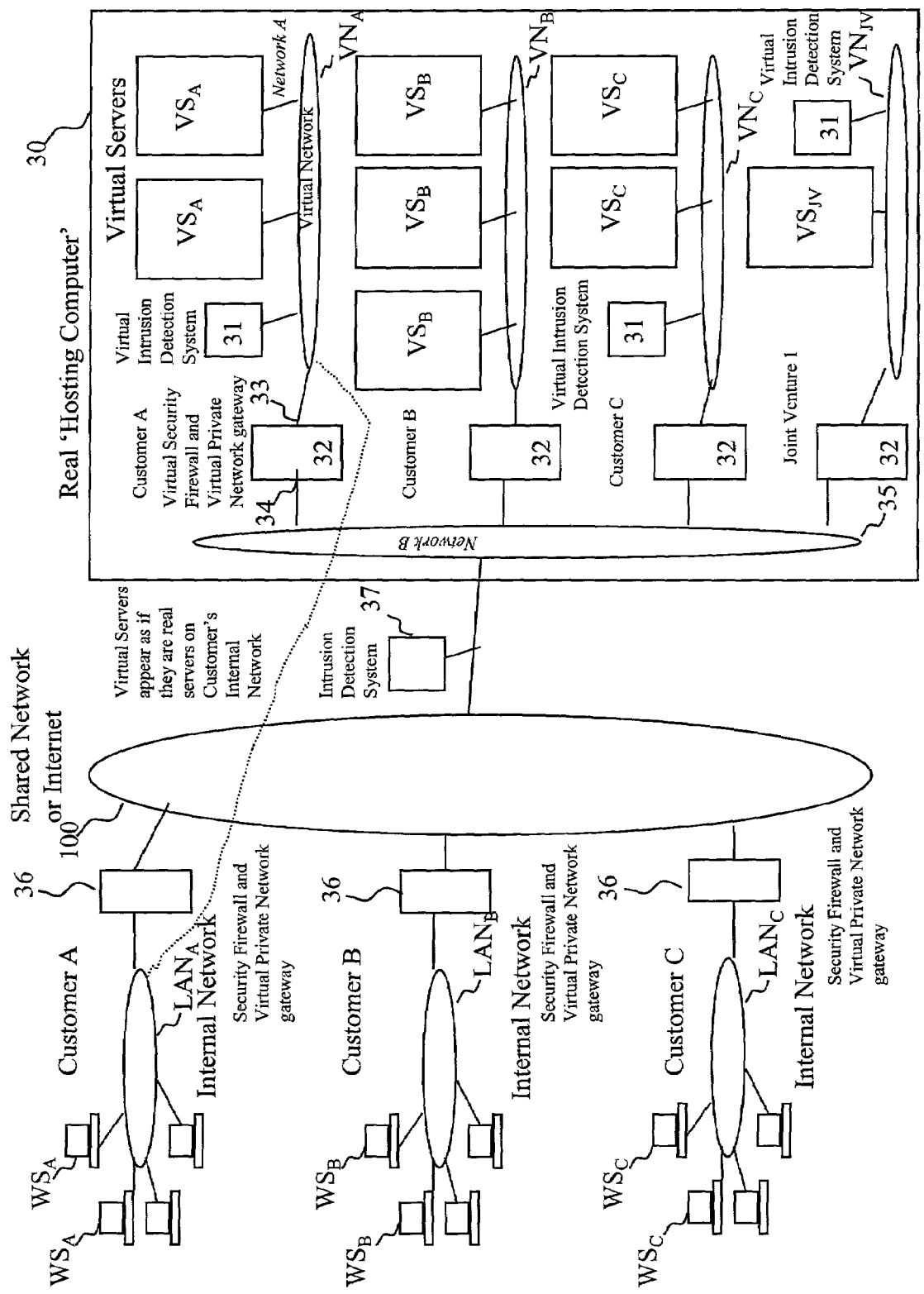
FIG. 4 shows schematically an example of a virtual apparatus arrangement for an embodiment of the present invention.

Reference is now made to FIG. 4 which shows schematically an example of a virtual apparatus for an embodiment of the present invention. The example shown in FIG. 4 makes use of virtual networks within a real server, virtual security firewalls, embedded virtual private networks, and security intrusion detection.

One or more virtual servers VSA (two being shown in FIG. 1) are created for a first customer A within a real computer 30 using virtual machine software. Software system management programs are used to control configurations within the virtual machine software. A first virtual network VNA for the first customer A is created inside the real computer 30 to which customer A's virtual servers VSA are connected by means of the virtual machine software. A further virtual server 31 is created on which an operating system and intrusion detection software system is installed, the further virtual server 31 also being connected to the first virtual network VNA.

A yet further virtual server 32 is created having two virtual network interfaces 33,34. One interface 33 connects to customer A's virtual network VNA. The other interface 34 connects to a virtual "super" network 35 which also attaches to one of the real network interfaces of the real computer 30 which in turn is physically connected to a (potentially insecure) external network (such as the Internet) 100. Customer A's real local area network LANA connects to the external network 100 via a server 36 running firewall and virtual private network software. Firewall operating systems and software are installed on the virtual server 32 and software is programmed with required access and logging rules. Virtual Private Network software is also installed on the firewall virtual server 32 and connections programmed to connect the customer's network LANA to the virtual network VNA via an encrypted secure channel. Thus, only customer A can access customer A's virtual network VNA and virtual servers VSA. As mentioned, customer A will typically have a hardware firewall system running firewall and Virtual Private Network software on the real server 36 interposed between customer A's network LANA and the external network 100. Customer A's individual workstations WSA are shown connected to customer A's network LANA. An intrusion detection system 37 is preferably installed between the external network 100 and the real host computer 30.

Unless the virtual servers VSA have been previously preloaded with software, operating system software and applications are installed onto the virtual servers.

Once the systems described above are built, the arrangement appears to customer A's organisation entirely as if the virtual servers VSA and applications and data on them are running on conventional physical hardware and directly connected into customer A's network LANA, as indicated schematically in FIG. 4 by a dotted line.

The same process can be repeated for additional, unconnected customers B and C and the joint venture JV, as indicated schematically in FIG. 4.

Figure 5:
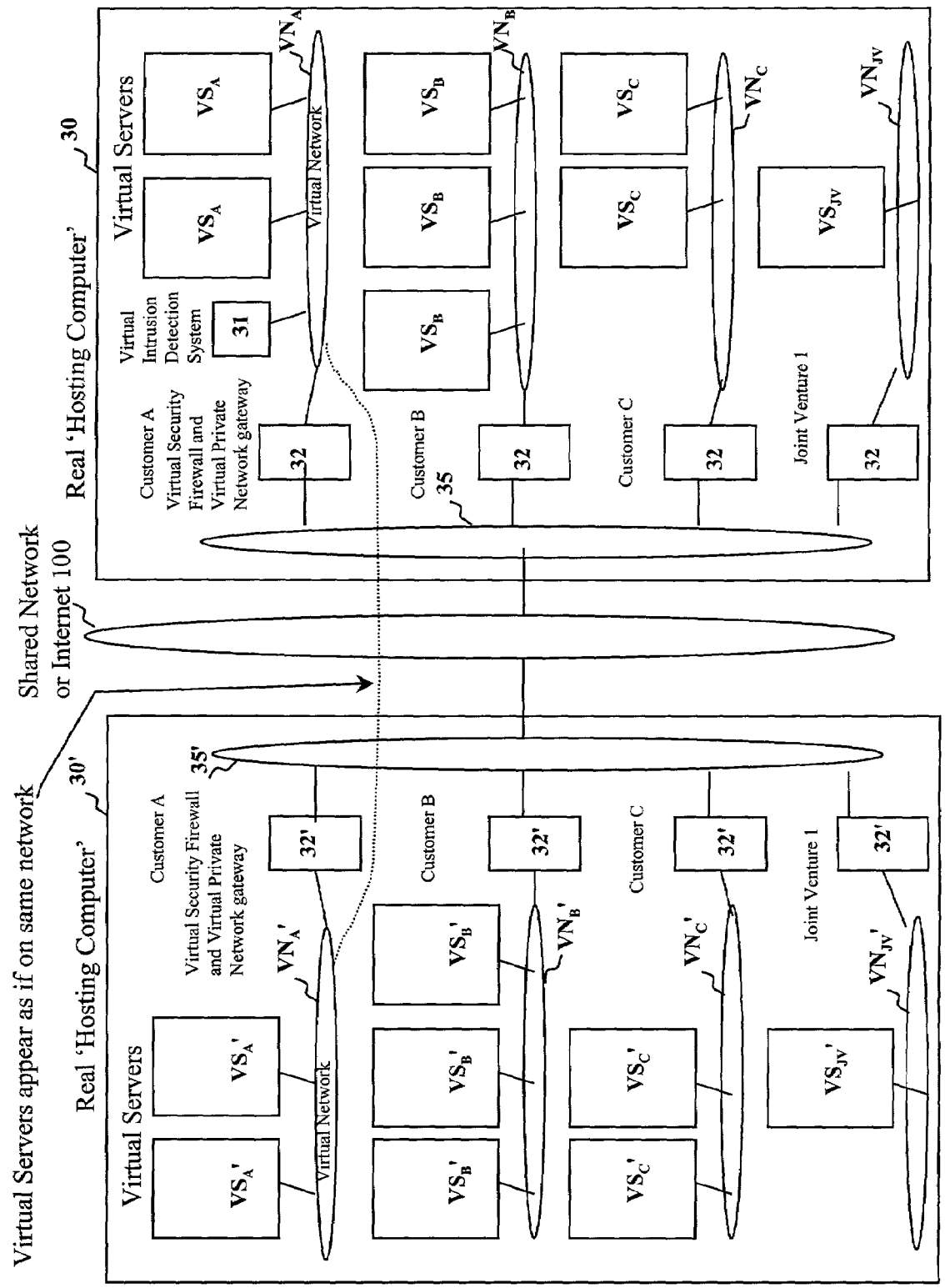
FIG. 5 shows schematically the connection of multiple similar virtual server networks created on physically separate real computers.

FIG. 5 shows schematically how multiple similar virtual server networks created on physically separate (and possibly geographically distant) real computers 30,30' can be interconnected using virtual private network technology. As will be understood from FIG. 5, a first real computer 30 is set up as described above with reference to FIG. 4 to provide virtual networks VN with virtual servers VS for plural customers A,B,C,JV. The virtual "super" network 35 of the first real computer 30 is connected via the external network 100 to a virtual "super" network 35' of a second real computer 30' that is set up in a corresponding manner to provide a second set of virtual networks VN' with virtual servers VS' for the plural customers A,B,C,JV. Each customer's virtual servers VS,VS' appear to the customer as if they are on the same (real) network. A large number of other customers' systems can be similarly constructed in virtual space to share the same hardware systems.

It will be appreciated that different configurations for the virtual servers, virtual networks, virtual operating systems and virtual firewalls, etc., may be used according to different customers' requirements.

Figure 6:
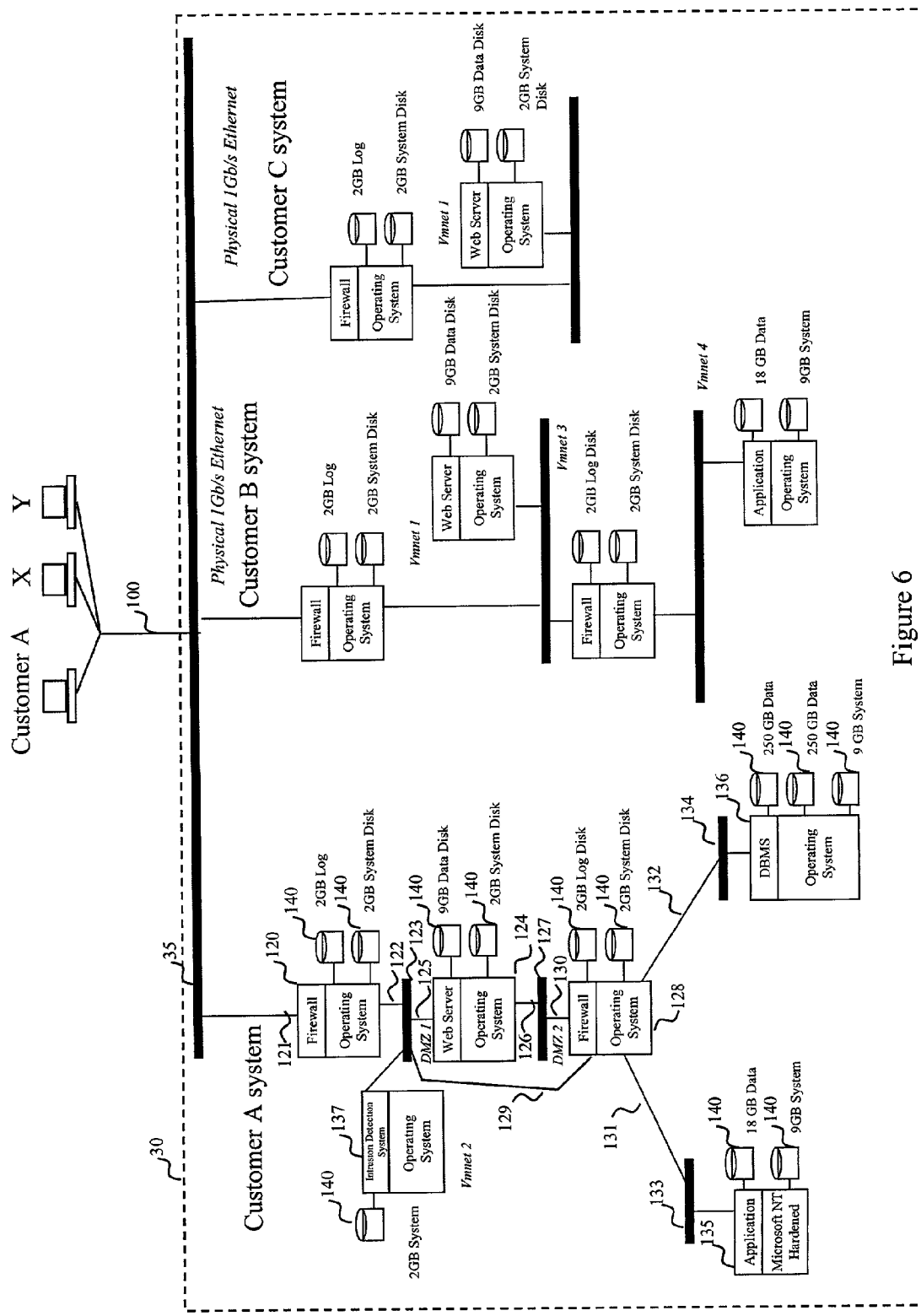
FIG. 6 shows schematically another example of an embodiment of the present invention.

An example of a Web hosting configuration which can provide services to a broad customer base is illustrated schematically in FIG. 6. Services that can be delivered through this arrangement include "intellectual property" and streaming media services, simple Web hosting services, and complex e-commerce Web hosting services. The example shown makes use of virtual networks within the real server; virtual security firewalls, including virtual multi-port firewalls; and, security intrusion detection. The example shown can in particular provide security-protected transactional Web services to a large number of users on an external network, in addition to providing secure virtual private network connections to the customer who "owns" the e-commerce system hosted on the real computer 30.

In the particular example of a complex Web hosting system shown in FIG. 6, for a first customer A, a two-port security firewall is created by creating a virtual server 120 having two virtual network connections 121,122 and on which a firewall operating system and firewall software is installed. One port 121 is connected to the "super" virtual network 35 which connects to a real external network interface 100. The other port 122 is connected to a first virtual network 123 (DMZ1) commonly referred to by practitioners in the art as a "DeMilitarised Zone" or "DMZ".

A two-port Webserver is created by creating a virtual server 124 with two virtual network ports 125,126 and on which an operating system and Web server software is installed. One port 125 is connected to the first virtual network 123 (DMZ1) and the other port 126 is connected to a second virtual network 127 (DMZ2) within the real computer 30.

A four port firewall is created by creating a further virtual server 128 having four virtual network connections 129,130, 131,132 and on which firewall operating system and firewall software is installed. A first port 129 is connected to the first virtual network 123 (DMZ1), a second port 130 is connected to second virtual network 127 (DMZ2), and the further two ports 131,132 are each connected to separately created virtual networks 133,134 which respectively connect to one of two further virtual servers 135,136 which are created within the real computer 30. One of the further virtual servers 135 is configured with an operating system and loaded with application software. The other further virtual server 136 is configured with an operating system and loaded with database management system software. Virtual disks 140 are attached to the virtual servers of the sizes required by the customer or the application.

Customer A's e-commerce application system and data are then loaded and configured on the virtual Web server 124, application server 135 and database server 136 as is conventional in e-commerce systems, and firewall rules set up to allow only communications essential to the normal functioning of the application. A yet further virtual server 137 is created on which intrusion detection software system is installed, the further virtual server 137 also being connected to the first virtual network 123 (DMZ1).

Virtual private network connections may be made to conventional servers on customer A's networks or to additional virtual server networks in the manner described above.

The system appears to users X and Y of the service and the customer A as a "complex Web" hosting system constructed out of discrete physical servers and firewalls.

A large number of other customers' Web hosting and e-commerce systems can be similarly constructed in virtual space to share the same hardware systems as shown schematically in FIG. 6 for further customers B and C, each of whom may require very different arrangements, configurations and capacities of virtual server, firewall, disk and network apparatus.

Further enhancements may be made using one or more of the variations and enhancements discussed above. For example, configuration of virtual servers can be performed by the customer using a Web-based system configurator; resource management and charge-back of usage to customers may be automatic; if one hardware system fails or becomes overloaded, systems can be checkpointed using virtual machine software and restarted on other hardware; using hardware hot-swap features, additional hardware can be installed and old hardware removed while virtual servers are running; multiple layers of guest virtual server may be employed, whereby virtual servers are created inside other virtual servers, for added functionality or security isolation.

Embodiments of the present invention have been described with particular reference to the examples illustrated. However, it will be appreciated that variations and modifications may be made to the examples described within the scope of the present invention. For example, it may be desirable to provide for a "tunnel" between two real physical machines in order to allow for direct communication along a back-channel between one virtual machine running on one of the physical machines and another virtual machine running on the other of the physical machines.

What is claimed is:

1. Apparatus operated by a computer service provider and providing one or more computer services for a plurality of customers of the computer service provider, the apparatus comprising:

a real computer, operated by a computer service provider and coupled to a real network, on which is set up at the request of each of a plurality of customers of the computer service provider at least one virtual machine for each of said customers;

wherein said at least one virtual machine for each of said customers is configured to provide one or more computer services over the real network for each respective customer; and wherein said at least one virtual machine for each of said customers comprises a specification specified by and configurable by the respective customer, and further comprises a separate operating system running thereon.

2. Apparatus according to claim 1, wherein plural virtual machines are set up within the real computer for at least one of said customers.

3. Apparatus according to claim 1, wherein the or each virtual machine for at least one of said customers is connected to a virtual network set up for said at least one customer within the real computer.

4. Apparatus according to claim 3, comprising a virtual intrusion detection device for detecting an attack on the virtual network.

5. Apparatus according to claim 1, wherein at least one virtual machine is connected to a virtual firewall that is connectable to an external network to which customers and/or other users can connect such that access to said at least one virtual machine by a customer or other user via a said external network can only take place through a virtual firewall.

6. Apparatus according to claim 5, wherein the or at least one of the virtual firewalls is implemented by a virtual machine on the real computer, said virtual firewall virtual machine running firewall software.

7. Apparatus according to claim 1, wherein the or each virtual machine for a particular customer is connected to a virtual firewall that is dedicated to that customer's virtual machine or machines, each virtual firewall being connectable to an external network to which each of said customers and/or other users can connect such that access to a virtual machine by a customer or other user via a said external network can only take place through a virtual firewall provided for that virtual machine or machines.

8. Apparatus according to claim 7, wherein each virtual firewall is set up within the real computer, the or each virtual machine for each customer being connected to a first port of the virtual firewall that is dedicated to that customer's virtual machine or machines, each virtual firewall having a second port connected to a virtual network that is set up within the real computer and that is connectable to an external network.

9. Apparatus according to claim 8, wherein the second port of each virtual firewall is connected to the same virtual network that is set up within the real computer and that is connectable to an external network.

10. Apparatus according to claim 1, comprising a plurality of real data storage devices and at least one virtual storage subsystem that is configured to allow said real data storage devices to emulate one or more virtual storage devices.

11. Apparatus according to claim 10, wherein the at least one virtual storage subsystem is configured to emulate at least one respective virtual storage device for each customer.

12. Apparatus according to claim 10, comprising a detection device for detecting evidence of malicious software or hostile attack signatures on the at least one virtual storage subsystem.

13. Apparatus according to claim 1, wherein the apparatus is configurable to provide at least one of the services selected from: file, data and archiving services; applications hosting services; database hosting services; data warehouse services; knowledge management hosting services; digital media production services; intellectual property and streaming media services; simple web hosting services; complex e-Commerce web hosting services; high performance computation services; electronic messaging and conferencing services; and, learning neuro-computer services.

14. Apparatus according to claim 1, comprising virtual private network software to provide an encrypted communication channel for communication between at least some of said virtual machines.

15. Apparatus according claim 1, comprising virtual private network software to provide an encrypted communication channel for communication between at least one virtual machine and an external computer.

16. Apparatus according claim 1, comprising virtual private network software to provide an encrypted communication channel for communication between a first virtual network and a second virtual network.

17. Apparatus according to claim 1, comprising virtual private network software to provide an encrypted communication channel for communication between a virtual network and an external computer.

18. Apparatus according claim 1, wherein the real computer comprises plural physical computers.

19. In combination, a first apparatus according to claim 1 and a second apparatus that is substantially identical to said first apparatus, the first and second apparatus being connected by a communications channel so that the second apparatus can provide for redundancy of the first apparatus thereby to provide for disaster recovery if the first apparatus fails.

20. Apparatus according to claim 1, wherein at least one of said virtual machines provides at least a virtual central processor unit.

21. Apparatus according to claim 1, wherein at least one of said virtual machines is created using a virtual machine abstraction program.

22. Apparatus according to claim 1, wherein at least one of said virtual machines is created using machine simulation/emulation software.

23. Apparatus according to claim 1, wherein the one or more computer services for the respective customers are provided over a virtual network which is implemented over said real network.

24. Apparatus according to claim 1, wherein the real computer is arranged such that the specification of said at least one virtual machine for each of said customers is specified by and configurable by the respective customer over said real network or another real network.

25. Apparatus according to claim 24, wherein the real computer is arranged such that the specification of said at least one virtual machine for each of said customers is specified by and configurable by the respective customer over a virtual network which is implemented on said real network or said another real network.

26. Apparatus according to claim 1, further comprising a system configurator program that accepts said specification from each of said customers, said configurator program being operable to modify, based on said specification, the configuration of said at least one virtual machine.

27. A method of providing one or more computer services for a plurality of customers of a computer service provider, the method comprising the steps of:

a service provider setting up on a real computer, at the request of each of said customers, at least one virtual machine for each of said customers of the computer service provider whereby each virtual machine for each of said customers is configured to provide one or more computer services over a real network for each respective customer;

the real computer accepting specification and configuration information for the virtual machines from each of said customers whereby the specification of each of the virtual machines is specified by and configurable by the respective customer, each virtual machine comprising a separate operating system running thereon.

28. A method according to claim 27, comprising the step of setting up plural virtual machines within the real computer for at least one of said customers.

29. A method according to claim 27, comprising the steps of setting up a virtual network for at least one of said customers within the real computer, and connecting the or each virtual machine for said at least one customer to said virtual network.

30. A method according to claim 29, comprising the step of using a virtual intrusion detection device for detecting an attack on the virtual network.

31. A method according to claim 27, comprising the steps of connecting at least one virtual machine to a virtual firewall, and connecting the or each virtual firewall to an external network to which customers and/or other users can connect such that access to a virtual machine by a customer or other user via a said external network can only take place through a virtual firewall.

32. A method according to claim 27, comprising the step of connecting the or each virtual machine for a particular customer to a virtual firewall that is dedicated to that customer's virtual machine or machines, and connecting each virtual firewall to an external network to which each of said customers and/or other users can connect such that access to a virtual machine by a customer or other user via a said external network can only take place through a virtual firewall provided for that virtual machine or machines.

33. A method according to claim 32, wherein each virtual firewall is set up within the real computer, the or each virtual machine for each customer being connected to a first port of the virtual firewall that is dedicated to that customer's virtual machine or machines, each virtual firewall having a second port connected to a virtual network that is set up within the real computer and that is connected to an external network.

34. A method according to claim 33, wherein the second port of each virtual firewall is connected to the same virtual network that is set up within the real computer and that is connectable to an external network.

35. A method according to claim 27, comprising the step of configuring at least one virtual storage subsystem to allow multiple real data storage devices to emulate one or more virtual storage devices.

36. A method according to claim 35, comprising the step of configuring the at least one virtual storage subsystem to emulate at least one respective virtual storage device for each customer.

37. A method according to claim 35, comprising the step of using a detection device for detecting evidence of malicious software or hostile attack signatures on the at least one virtual storage subsystem.

38. A method according to claim 27, wherein the services provided include at least one of the services selected from: file, data and archiving services; applications hosting services; database hosting services; data warehouse services; knowledge management hosting services; digital media production services; intellectual property and streaming media services; simple web hosting services; complex e-Commerce web hosting services; high performance computation services; electronic messaging and conferencing services; and, learning neuro-computer services.

39. A method according to claim 27, comprising the step of using virtual private network software to provide an encrypted communication channel for communication between at least some of said virtual machines.

40. A method according to claim 27, comprising the step of using virtual private network software to provide an encrypted communication channel for communication between at least one virtual machine and an external computer.

41. A method according to claim 27, comprising the step of using virtual private network software to provide an encrypted communication channel for communication between a first virtual network and a second virtual network.

42. A method according to claim 27, comprising the step of using virtual private network software to provide an encrypted communication channel for communication between a virtual network and an external computer.

43. A method according to claim 27, comprising the step of moving said at least one virtual machine from a first real computer to a second real computer.

44. A method according to claim 27, wherein at least one of said virtual machines provides at least a virtual central processor unit.

45. A method according to claim 27, wherein at least one of said virtual machines is created using a virtual machine abstraction program.

46. A method according to claim 27, wherein at least one of said virtual machines is created using machine simulation/emulation software.

47. A method according to claim 27, wherein said real computer accepting said specification comprises accepting said specification over said real network or another real network.

48. A method according to claim 47, wherein said real computer accepting said specification comprises accepting said specification over a virtual network which is implemented over said real network or said another real network.

49. A method of operating a real computer on behalf of a plurality of customers of an operator of the real computer, the method comprising the steps of:
operating a plurality of virtual machines on the real computer so as to provide respective computer services for the respective customers over a real network; and
receiving at each of said plural virtual machines a specification specified by and configurable by a respective one of the customers of the operator of the real computer in accordance with a computer service to be provided by the virtual machine on behalf of that customer;
wherein each of said virtual machines comprises a separate operating system running thereon.

50. A method according to claim 49, comprising the step of operating plural virtual machines within the real computer for at least one of said customers.

51. A method according to claim 49, comprising the step of operating a virtual network for at least one of said customers within the real computer, the or each virtual machine for said at least one customer being connected to said virtual network.

52. A method according to claim 51, comprising the step of using a virtual intrusion detection device for detecting an attack on the virtual network.

53. A method according to claim 49, wherein at least one virtual machine is connected to a virtual firewall, the or each virtual firewall being connected to an external network to which customers and/or other users can connect such that access to a virtual machine by a customer or other user via a said external network can only take place through a virtual firewall.

54. A method according to claim 49, wherein the or each virtual machine for a particular customer is connected to a virtual firewall that is dedicated to that customer's virtual machine or machines, each virtual firewall being connected to an external network to which each of said customers and/or other users can connect such that access to a virtual machine by a customer or other user via a said external network can only take place through a virtual firewall provided for that virtual machine or machines.

55. A method according to claim 54, wherein each virtual firewall is set up within the real computer, the or each virtual machine for each customer being connected to a first port of the virtual firewall that is dedicated to that customer's virtual machine or machines, each virtual firewall having a second port connected to a virtual network that is set up within the real computer and that is connected to an external network.

56. A method according to claim 55, wherein the second port of each virtual firewall is connected to the same virtual network that is set up within the real computer and that is connectable to an external network.

57. A method according to claim 49, wherein at least one virtual storage subsystem is provided and configured to allow multiple real data storage devices to emulate one or more virtual storage devices.

58. A method according to claim 57, wherein the at least one virtual storage subsystem is configured to emulate at least one respective virtual storage device for each customer.

59. A method according to claim 57, wherein a detection device is used for detecting evidence of malicious software or hostile attack signatures on the at least one virtual storage subsystem.

60. A method according to claim 49, wherein the services provided include at least one of the services selected from: file, data and archiving services; applications hosting services; database hosting services; data warehouse services; knowledge management hosting services; digital media production services; intellectual property and streaming media services; simple web hosting services; complex e-Commerce web hosting services; high performance computation services; electronic messaging and conferencing services; and, learning neuro-computer services.

61. A method according to claim 49, comprising the step of using virtual private network software to provide an encrypted communication channel for communication between at least some of said virtual machines.

62. A method according to claim 49, comprising the step of using virtual private network software to provide an encrypted communication channel for communication between at least one virtual machine and an external computer.

63. A method according to claim 49, comprising the step of using virtual private network software to provide an encrypted communication channel for communication between a first virtual network and a second virtual network.

64. A method according to claim 49, comprising the step of using virtual private network software to provide an encrypted communication channel for communication between a virtual network and an external computer.

65. A method according to claim 49, comprising the step of moving said at least one virtual machine from a first real computer to a second real computer.

66. A method according to claim 49, wherein at least one of said virtual machines provides at least a virtual central processor unit.

67. A method according to claim 49, wherein at least one of said virtual machines is created using a virtual machine abstraction program.

68. A method according to claim 49, wherein at least one of said virtual machines is created using machine simulation/emulation software.

69. A method according to claim 49, wherein receiving at each of said plural virtual machines said specification comprises receiving said specification over said real network or another real network.

70. A method according to claim 69, wherein receiving at each of said plural virtual machines said specification comprises receiving said specification over a virtual network which is implemented over said real network or said another real network.

71. A method of providing for a plurality of customers of an operator of a real computer one or more computer services selected from: file, data and archiving services; applications hosting services; database hosting services; data warehouse services; knowledge management hosting services; digital media production services; intellectual property and streaming media services; simple web hosting services; complex e-Commerce web hosting services; high performance computation services; electronic messaging and conferencing services; and, learning neuro-computer services; the method comprising the steps of:

said operator setting up on said real computer at the request of each of said customers at least one virtual machine for each of said customers of the operator to provide one or more computer services for each of said customers over a real network; and receiving at said at least one virtual machine for each of said customers a specification determined in accordance with the computer service or services requested by said customer and configurable by said customer, said at least one virtual machine having a separate operating system running thereon.

72. A method according to claim 71, comprising the step of moving said at least one virtual machine from a first real computer to a second real computer.

73. A method according to claim 71, wherein receiving at said at least one virtual machine for each of said customers a specification comprises receiving said specification over said real network or another real network.

74. A method according to claim 73, wherein receiving at said at least one virtual machine for each of said customers a specification comprises receiving said specification over a virtual network which is implemented over said real network or said another real network.

* * * * *